US011675752B2

(12) United States Patent
Sayers et al.

(10) Patent No.: US 11,675,752 B2
(45) Date of Patent: Jun. 13, 2023

(54) SYSTEMS AND METHODS FOR GENERATING SCHEMA NOTIFICATIONS

(71) Applicants: Atlassian Pty Ltd., Sydney (AU); Atlassian Inc., San Francisco, CA (US)

(72) Inventors: Ben Sayers, Sydney (AU); Sebastian Tello, Sydney (AU); Igor Sechyn, Delmenhorst (DE); Mauri Edo, Sydney (AU); Andrew Brainwood, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 326 days.

(21) Appl. No.: 16/586,556

(22) Filed: Sep. 27, 2019

(65) Prior Publication Data

US 2021/0097038 A1    Apr. 1, 2021

(51) Int. Cl.
G06F 16/00    (2019.01)
G06F 16/21    (2019.01)
G06F 16/25    (2019.01)

(52) U.S. Cl.
CPC .......... *G06F 16/213* (2019.01); *G06F 16/214* (2019.01); *G06F 16/258* (2019.01)

(58) Field of Classification Search
None
See application file for complete search history.

(56) References Cited

U.S. PATENT DOCUMENTS

| 6,915,287 | B1* | 7/2005 | Felsted | G06F 16/289 |
| 6,980,993 | B2* | 12/2005 | Horvitz | G06F 21/6236 |
| | | | | 707/999.102 |
| 7,310,650 | B1* | 12/2007 | Felsted | G06F 16/289 |
| 7,548,932 | B2* | 6/2009 | Horvitz | H04L 67/564 |
| | | | | 707/999.102 |
| 7,613,702 | B2* | 11/2009 | Horvitz | H04L 67/306 |
| | | | | 707/999.102 |
| 7,613,721 | B2* | 11/2009 | Horvitz | G06F 21/335 |
| 7,613,722 | B2* | 11/2009 | Horvitz | G06F 21/6245 |
| | | | | 707/999.102 |
| 7,996,437 | B2* | 8/2011 | Koizumi | G06F 16/36 |
| | | | | 707/802 |
| 8,631,323 | B1* | 1/2014 | Gray | G06F 8/33 |
| | | | | 717/113 |
| 9,348,568 | B2* | 5/2016 | Zachariah | G06F 8/51 |
| 10,616,337 | B1* | 4/2020 | Satyanarayana | H04L 41/22 |
| 11,010,399 | B1* | 5/2021 | Horesh | G06F 16/986 |
| 2003/0131142 | A1* | 7/2003 | Horvitz | G06F 21/629 |
| | | | | 719/313 |
| 2004/0002958 | A1* | 1/2004 | Seshadri | H04L 51/24 |

(Continued)

OTHER PUBLICATIONS

Type Safety with JSON Subschema, Habib et al., (Year: 2020).*

(Continued)

*Primary Examiner* — Jean M Corrielus
(74) *Attorney, Agent, or Firm* — Brownstein Hyatt Farber Schreck, LLP

(57) ABSTRACT

The present disclosure describes systems and methods for processing schemas to generate set representations thereof. Schema set representations can be used to generate schema coverage notifications. Set operations can be performed on schemas to compare schemas and identify whether any support changes have been made thereto.

19 Claims, 10 Drawing Sheets

(56) References Cited

U.S. PATENT DOCUMENTS

| | | | | |
|---|---|---|---|---|
| 2006/0155725 | A1* | 7/2006 | Foster | G06F 16/88 |
| 2007/0150495 | A1* | 6/2007 | Koizumi | G06F 16/36 |
| 2009/0016632 | A1* | 1/2009 | Yano | H04N 5/23235 |
| | | | | 348/E9.01 |
| 2014/0279834 | A1* | 9/2014 | Tsirogiannis | G06F 16/235 |
| | | | | 707/602 |
| 2014/0279838 | A1* | 9/2014 | Tsirogiannis | G06F 16/86 |
| | | | | 707/603 |
| 2016/0277920 | A1* | 9/2016 | Rajasekar | H04L 65/1016 |
| 2017/0206256 | A1* | 7/2017 | Tsirogiannis | G06F 16/22 |
| 2018/0089232 | A1* | 3/2018 | Spektor | G06N 5/046 |
| 2018/0357324 | A1* | 12/2018 | Chakraborty | G06F 3/04895 |
| 2019/0272157 | A1* | 9/2019 | Stella | G06F 40/143 |
| 2020/0387498 | A1* | 12/2020 | Sundelin | G06F 16/23 |

OTHER PUBLICATIONS

JSON: data model, query languages and schema specification, Bourhis et al., (Year: 2017).*

Research on the translation from XSD to JSON schema, Guo et al., (Year: 2017).*

\* cited by examiner

SYSTEMS AND METHODS FOR GENERATING SCHEMA NOTIFICATIONS

FIELD OF THE DISCLOSURE

The present disclosure generally relates to systems and methods for generating schema notifications.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Most, if not all, of modern computing relies on communication between multiple software components. To enable such communications, application programming interfaces (APIs) are used to clearly define how software components communicate with one another.

As one example, any client-server system requires a client system (as configured by software and/or hardware) to communicate with a server system (as configured by software and/or hardware). To enable these communications a web API may be used to define the format of requests and responses that are sent between a client and server.

In many cases APIs evolve over time. For example, as the functionality of a software component changes so too may the API to expose those changes to the world. Making changes to an API can present certain challenges.

For example, as the schema or definition for an API becomes more and more complex it can become difficult to so see potential semantic issues. As one example, it is entirely possible that a complex API schema will be syntactically correct yet semantically non-sensical. To illustrate this, consider an API call that requires an integer that is less than 5 but greater than 6. Such a requirement can easily be imposed in a syntactically correct manner, but the result is a requirement that cannot be satisfied.

By way of further example, as an API schema evolves changes may be made that 'break' previous versions of the schema. To illustrate this issue, consider version 1 of an API schema which requires a particular variable to be a number (i.e. integer or floating point). A change is then made and in version two of the schema the particular variable needs to be an integer. Such a change is breaking in the sense that something that was acceptable under version 1 of the schema (e.g. a variable value of 1.5) is no longer acceptable under version 2 (as 1.5 is not an integer).

Breaking changes to API schemas can be a significant issue in that they can instantaneously cause software to fail—often without warning and without any indication as why what was previously working no longer works.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

As described in the background, schemas are often used to define APIs. More generally, however, schemas can be used to define the format of any type of electronic record—e.g. for a particular type of record the variables that can be included in the record, any variables that must be included in the record, and the types of data accepted (or required) for each variable. The record in question may be a complete API permitting/dictating communications for a client/server system, or may be a much smaller schema defining, for example, the manner in which an address record is to be provided to/saved in/returned by a given application.

The present disclosure generally relates to systems and methods for processing schemas in order to generate schema notifications. Two different types of schema notifications are described: schema coverage notifications, which can inform a user (human or programmatic) whether a given schema accepts no inputs, all inputs, or some inputs; and schema support notifications, which can inform a user as to whether one schema accepts values not accepted by another and/or vice versa.

The generation of these notifications relies on processing one or more schemas to generate set representations thereof.

Figure 12:
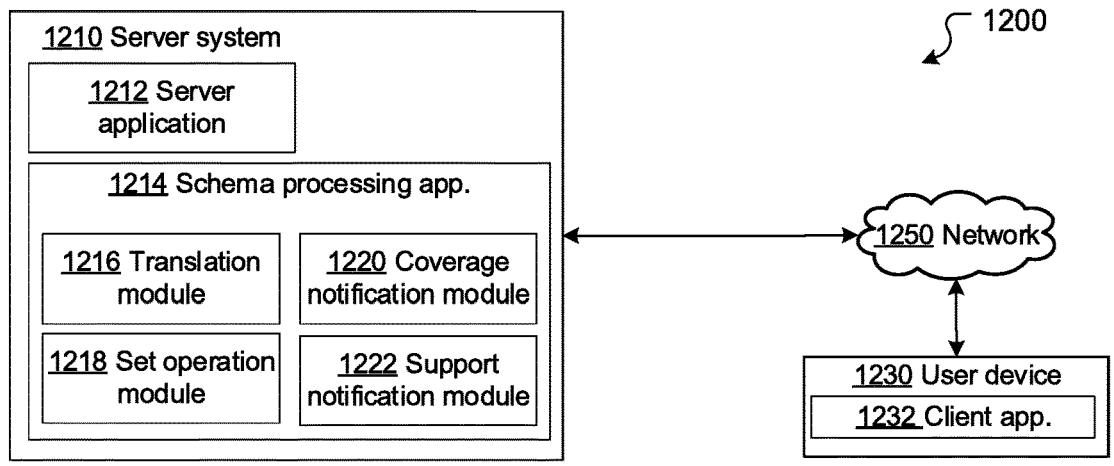
FIG. 12 illustrates an example client server architecture in which various embodiments described herein may be implemented.
Figure 13:
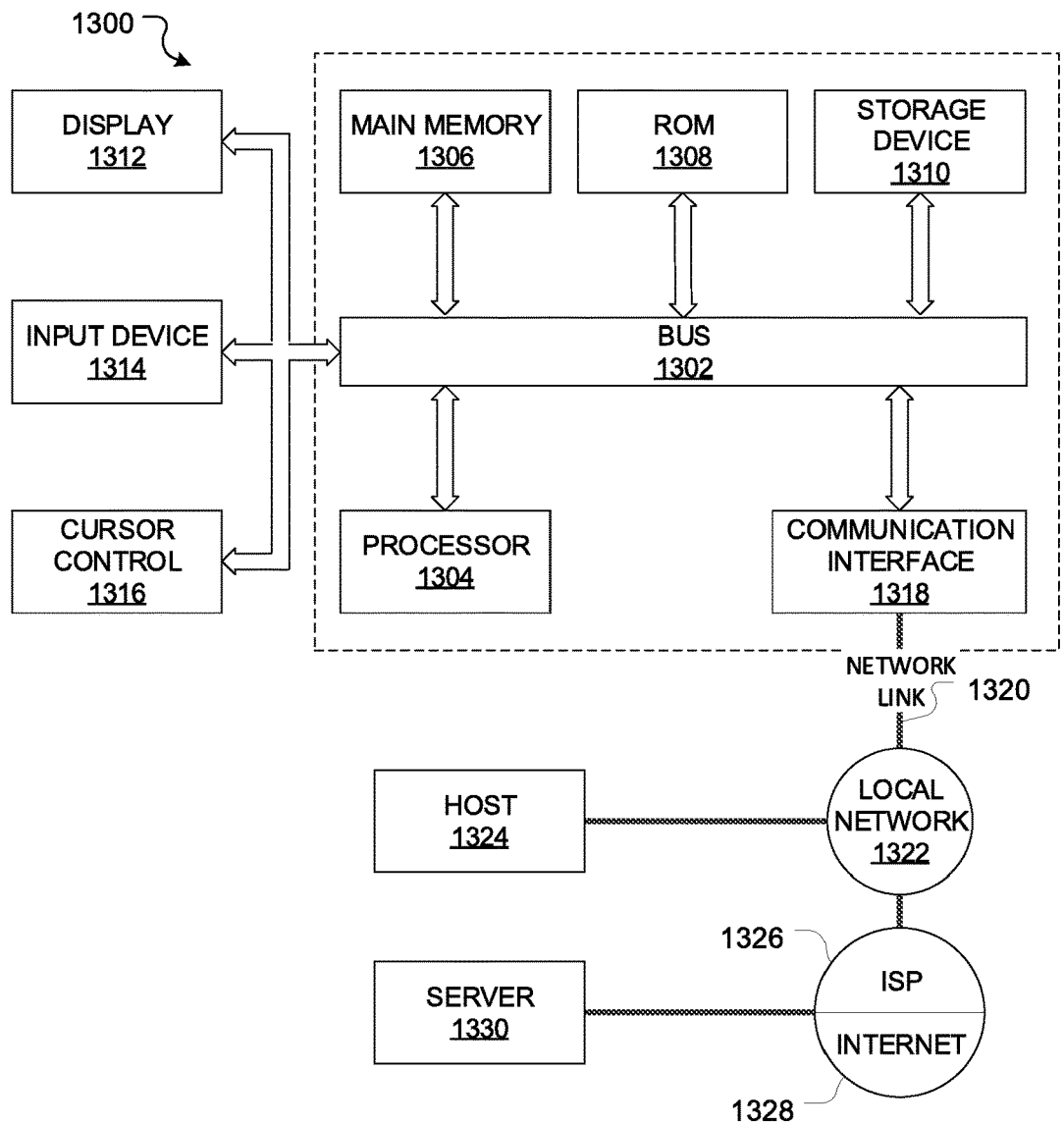
FIG. 13 is a block diagram illustrating a computer processing system, which may be used to implement various embodiments described herein.

This description takes the following general outline:
1. Note on use of JSON schema terminology
2. Schema set representations (FIG. 1)
3. Translating a schema to a set representation thereof (FIGS. 2 to 5)
4. Performing set operations on set representations of schemas
5. Generating coverage notifications (FIG. 6)
6. Comparing schemas
7. Generating support change notifications (FIG. 7)
8. Translating a set representation of a schema to a schema (FIGS. 8 to 11)
9. Example system architecture (FIG. 12)
10. Example computer processing system (FIG. 13)

Note on Use of JSON Schema Terminology

In order to illustrate various features, the description that follows focuses on schemas expressed in JavaScript Object Notation (JSON). The JSON schema specification is available from the JSON Schema organization. The techniques and features described herein can, however, be adapted for use with other schema formats, for example XSD (XMS schema definition) and Protocol Buffers to name two.

Accordingly, while JSON specific keywords and notation have been used to describe various features it will be appreciated that the keywords and notation are intended to capture more general concepts. For example, reference to the JSON 'object' data type is intended to refer to a general mapping data type that provides for mappings between keywords values. Similarly, reference to the JSON 'array' data type is intended to refer to a data type that provides for an ordered list of elements.

The various JSON specific keywords that are described should also be considered as capturing alternative implementations of the same or similar functionality.

For example, and generally speaking, the JSON validation keywords provide mechanisms for limiting the values that a schema will accept. For a given JSON validation keyword described, other schema formats may use a different keyword to impose the same type of constraints or simply not provide for that type of constraint. By way of specific example, reference to the maxItems JSON keyword applicable to JSON arrays should be considered reference to a general maximum item constraint that limits the number of items an array (or list or alternatively named data type) can have.

Similarly, the JSON specific Boolean logic keywords described should be considered general Boolean logic operators for combing schemas. I.e.: the 'anyOf' keyword is reference to an operator which indicates that a schema must be valid against any one of the schemas defined by the anyOf operator; the 'allOf' keyword is reference to an operator which indicates that a schema must be valid against all of the schemas defined by the allOf operator; the 'oneOf' keyword is reference to an operator which indicates that a schema must be valid against one and only one of the schemas defined by the oneOf operator; the 'not' keyword is reference to an operator which indicates that a schema must not be valid against a schema defined by the not operator.

The JSON specific conditional logic operators (if, then else) should also be treated in this manner—i.e. keyword operators that allow a schema (or subschema) to be applied based on the outcome of another schema.

Schema Set Representations

As noted above, the processes described herein initially require processing one or more schemas to generate corresponding set representations thereof.

In the embodiments described, an input schema is ultimately represented as what will be referred to as a complete set. Unless the schema prima facie accepts all or no values (e.g. in the JSON context is a single Boolean value true or false), the complete set will comprise a number of type sets—specifically, a type set for each data type supported by the translation process. Each type set, in turn, will comprise zero or more type subsets (each type subset being of the same type as the type set to which it belongs).

Figure 1A:
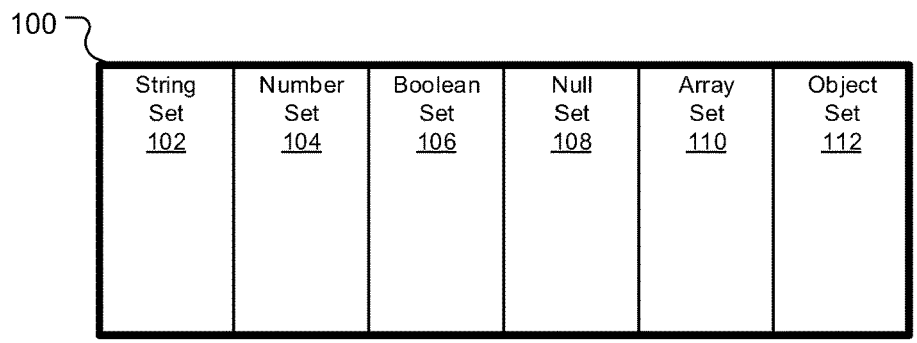
FIGS. 1A to 1E provide visual representations of complete sets.

FIG. 1A provides a visual representation of a complete set 100. complete set 100 is made up of the string type set 102, the number type set 104, the Boolean type set 106, the null type set 108, the array type set 110, and the object type set 112.

FIGS. 1B, 1C, 1D and 1E are provided to further illustrate the concept of complete set representations further. These are simply visual tools to aid in describing this concept and it will be appreciated that visual set representations need not be generated anywhere in the schema translation (or schema comparison) processes.

Figure 1B:
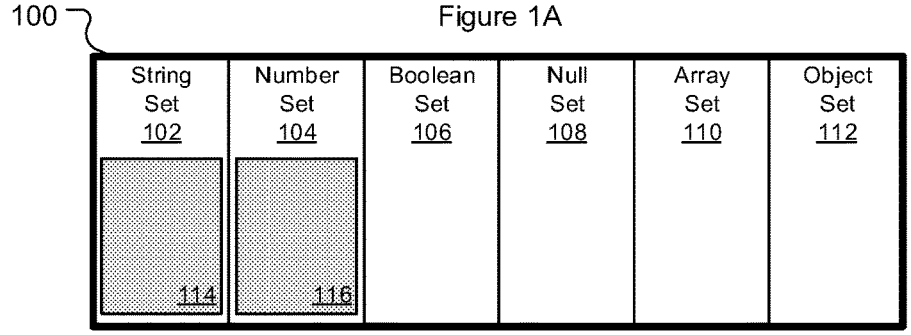

FIG. 1B provides a representation of example JSON Schema 1 provided in the table below:

| Example JSON Schema 1 |
|---|
| {<br>    "type": ["string", "number"]<br>} |

In FIG. 1B the string type set 102 includes a single string type subset 114 which is completely shaded (indicating all string values are accepted), and a single number type subset 116 which is also completely shaded (indicating all number values are accepted).

Figure 1C:
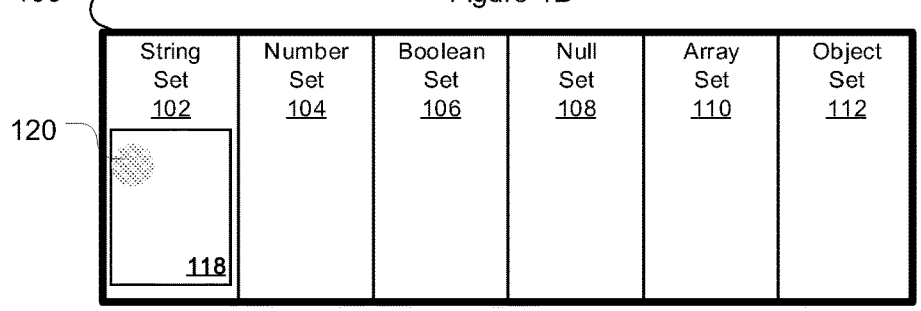

By way of further example, FIG. 1C provides a representation of example JSON Schema 2 provided in the table below:

| Example JSON Schema 2 |
|---|
| {<br>    "type": "string",<br>    "minLength": 10<br>} |

In FIG. 1C the string type set 102 includes a single string type subset 118 having a partially shaded region 120 (indicating that the schema accepts only certain strings—i.e. strings with a minimum length of 10).

Figure 1D:
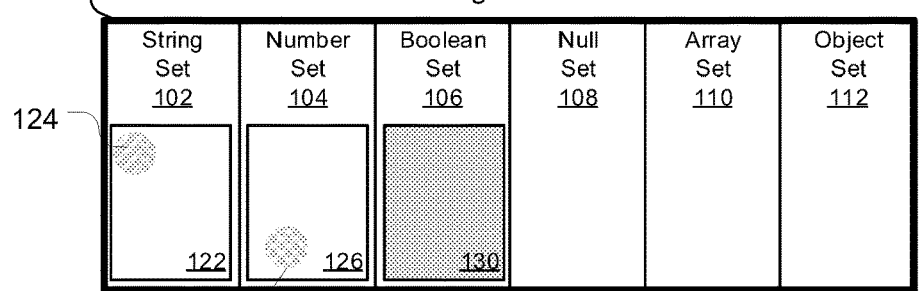

As a still further example: FIG. 1D provides a representation of example JSON Schema 3 provided in the table below:

| Example JSON Schema 3 |
|---|
| {<br>    "anyOf": [<br>        {<br>            "type": "string",<br>            "minLength": 10<br>        },<br>        {<br>            "type": "number",<br>            "maximum": 15 |

-continued

| Example JSON Schema 3 |
|---|
| ``` }, { "type": "boolean" } ] } ``` |

In FIG. 1D: the string type set 102 includes a single string type subset 122 having a partially shaded region 124 (indicating that the schema accepts only certain strings—i.e. strings with a minimum length of 10); the number type set 104 includes a single number type subset 126 having a partially shaded region 128 (indicating that the schema accepts only certain numbers—i.e. numbers with a maximum value of 15); the Boolean type set 106 includes a single Boolean type subset 130 which is completely shaded (indicating all Boolean values are accepted).

Figure 1E:
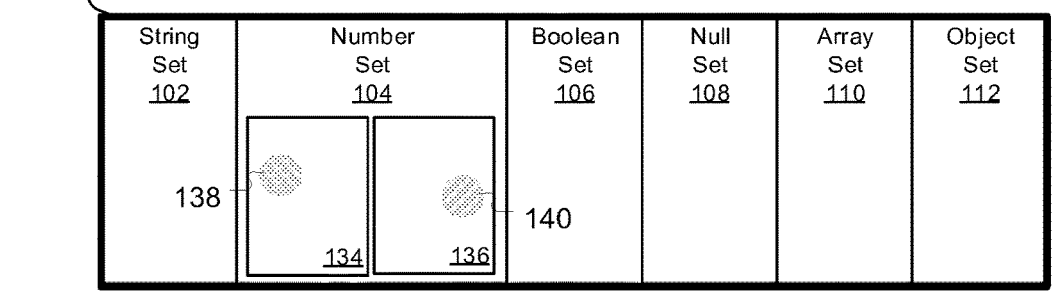
Figure 2:
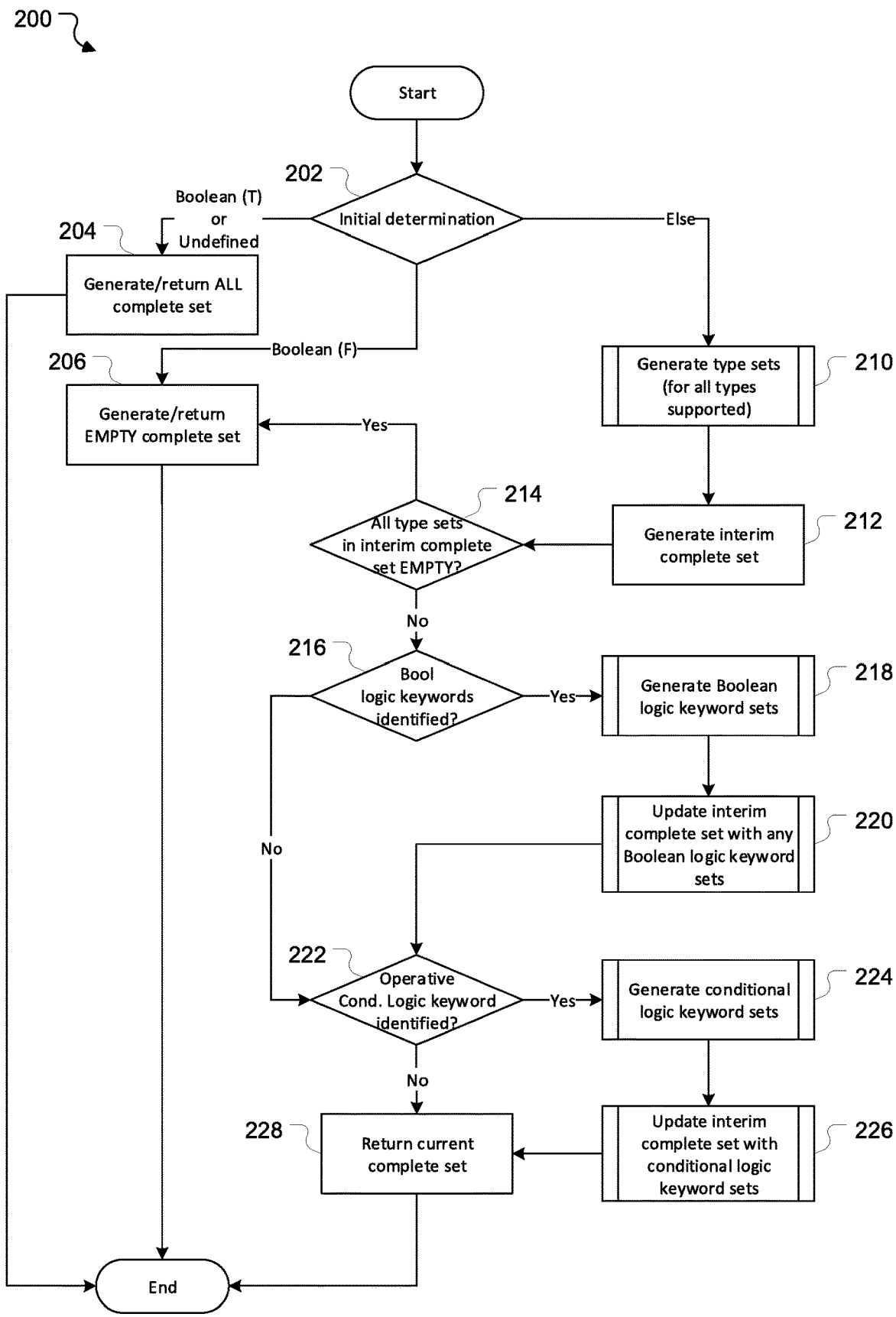
FIG. 2 is a flowchart illustrating processing performed by a computer processing system to translate a schema.

As a still further example: FIG. 1E provides a representation of example JSON Schema 4 provided in the table below:

| Example JSON Schema 4 |
|---|
| ``` { "anyOf": [ { "type": "number", "minimum": 5 "maximum": 10 }, { "type": "number", "minimum": 15 "maximum": 20 } ] } ``` |

In FIG. 1E: the number type set 104 includes two number type subsets, 132 and 134. Number type subset 132 includes a shaded region 136 (indicating that the schema accepts certain numbers—i.e. numbers between 5 and 10), and number type subset 134 includes a shaded region 138 (indicating that the schema also accepts other numbers—i.e. numbers between 15 and 20).

The terminology used herein with respect to set representations is as follows.

ALL Sets

An ALL type subset and an ALL type set indicate that all values of that type are accepted. For example, an ALL string type subset indicates that all string values are accepted, and an ALL array type subset indicates that all array values are accepted.

By way of example, an ALL number type set may take the following form:

| Example ALL type set |
|---|
| ``` { number: AllTypeSet { setType: 'number', type: 'all' }, } ``` |

The ALL complete set indicates that the schema as a whole accepts all values of all types. This can be represented, for example, as a single Boolean value true—e.g.:

| Example ALL complete set |
|---|
| True |

EMPTY Sets

An EMPTY type subset and EMPTY type set indicate that no values of that type are accepted. For example, an EMPTY array subset indicates that no array values are accepted, and an EMPTY Boolean subset indicates that no Boolean values are accepted.

By way of example, an EMPTY number type set may take the following form:

| Example EMPTY type set |
|---|
| ``` { number: EmptyTypeSet { setType: 'number', type: 'empty' }, } ``` |

The EMPTY complete set indicates that the schema as a whole accepts all values of all types. This can be represented, for example, as a single Boolean value false—e.g.:

| Example EMPTY complete set |
|---|
| False |

SOME Sets

A SOME type subset and SOME type set indicate that some values of that type are accepted. For example, a SOME number subset indicates that some, but not all, number values are accepted by the schema (and multiple SOME number subsets indicate different number values that are accepted).

Representation of SOME type and subtype sets depend on the type in question and the constraint keywords relevant thereto. Examples are provided below.

The SOME complete set indicates that the schema accepts at least some values. An example representation of a SOME complete set for a translation process that supports the array, boolean, null, number, object and string data types and a schema that accepts only numbers is as follows:

| Example SOME complete set |
|---|
| ``` SomeCompleteSet { config: { array: EmptyTypeSet { setType: 'array', type: 'empty' }, boolean: EmptyTypeSet { setType: 'boolean', type: 'empty' }, null: EmptyTypeSet { setType: 'null', type: 'empty' }, ``` |

| Example SOME complete set |
|---|
|     number: AllTypeSet { setType: 'number', type: 'all' },<br>    object: EmptyTypeSet { setType: 'object', type: 'empty' },<br>    string: EmptyTypeSet { setType: 'string', type: 'empty' } },<br>  type: 'some',<br>setType: 'complete' } |

Translating a schema to generate a set representation thereof provides a number of advantages. By way of example, generating a set representation of an input schema makes it possible to determine whether the input schema either accepts no inputs or accepts any input (and based thereon generate schema coverage notifications). Making such determinations and informing the relevant user thereof is a useful result.

By way of further example, set representations generated for two input schemas (for example an initial and a subsequent version of a schema) can be compared to determine differences between the two input schemas. In this case, the translation step is necessary due to the vocabulary richness that the JSON schema and other schema formats provide. In this context, therefore, translation generates a common/comparable form of the underlying schemas which can then be processed to determine relevant differences (and thereby generate schema support notifications).

Translating a Schema to a Set Representation Thereof

The schema to set representation translation process 200 will be described with reference to the flowcharts of FIGS. 2 to 5 which illustrate processing performed by a computer processing system. In certain embodiments, these processing steps are performed by a translation module (referred to as the TM for short) running on a computer processing system (e.g. translation module—TM—1216 as described below). In alternative implementations set operations may be performed by an alternative module or system.

Schema translation process 200 requires a dereferenced schema as input (or a pointer/reference to a location—local or remote—at which a dereferenced schema can be found). A dereferenced schema is a schema in which references within the schema have been removed and replaced with the referenced information. Dereferencing of a schema can be performed (and a dereferenced schema obtained) by passing a schema through a dereferencing tool or program. One example of a suitable dereferencing tool is json-schema-ref-parser, however other dereferencing tools can be used.

Schema translation process 200 further requires an input schema without any circular references (however translation process 200 could be adapted to handle circular references).

Schema translation process 200 further requires the dereferenced input schema to be valid—i.e. to comply with the syntax/grammar requirements of whichever schema format system is being used. For example, if the translation process is being used with JSON schemas, the input schema must comply with the JSON Schema specification. Syntactic validity of a schema can be checked using a schema validator. In the case of a JSON schema, validity can be checked by validating the input schema against the JSON schema itself (as defined at JSON-schema.org) using a validator such as AJV.

If a schema with one or more circular references, or a schema that is not syntactically valid, is passed as input to the translation process 200 a suitable error can be generated and returned—for example schema cannot be processed due to circular reference/syntax errors.

Note on Schema Types and Validation Keywords

Generally speaking, a schema format system will describe fundamental data types along with various keywords that can be used to impose value constraints.

In the JSON example, the JSON schema defines six fundamental data types: string, number, Boolean, null, array, and object. Each type has associated validation keywords associated therewith for imposing constraints. Furthermore, the JSON schema defines Boolean logic keywords that can be used to combine schemas (e.g. allOf, anyOf, oneOf, not) and keywords that can be used to apply schemas conditionally (e.g. if, then, else).

The present disclosure describes the handling of various data types (and certain selected validation keywords associated therewith) in order to illustrate the manner in which schemas can be translated. Other types (and validation keywords) can also be translated by using or adapting the techniques described herein.

In different implementations the schema processing application can be configured to support different fundamental types (and different validation keywords therefor). For example, in certain implementations the schema processing application may be configured to only support the object and array data types, and only selected validation keywords associated with those types. In alternative implementations, the schema processing application may be configured to support fewer/alternative/additional data types and validation keywords.

In implementations where the schema processing application is not configured to support all data types and all validation keywords associated with those types different approaches may (depending on context) be appropriate. For example, if the schema processing application encounters a certain type or particular validation keyword that is not supported it can be configured to either: ignore the type/validation keyword and continue processing; generate an appropriate message (e.g. "unsupported type/validation keyword x identified and ignored") and continue processing; or generate an appropriate message (e.g. "unsupported type/validation keyword x identified, processing terminated") and cease processing.

Even if the schema processing application is not configured to support all possible data types provided by the schema language (and/or all validation keywords of those types), useful results can still be generated.

For example, the 'Pattern' validation keyword (applicable to the String type) is, at least in certain contexts, relatively rarely used. In such contexts, therefore, a useful result can often be achieved even if the schema processing application does not support this validation keyword.

Schema Translation Process 200

At 202, the TM 1216 performs an initial determination in respect of the input schema.

In the context of a JSON input schema, the JSON specification provides that a JSON Schema must be an object or a Boolean value. The initial determination is a high level determination as to whether the input schema accepts all values, no values, or some values.

ALL Complete Set Generation

If, at 202, the TM 1216 initially determines that the input schema is undefined (i.e. the translation process has been called without an input schema, which can occur when the translation process calls itself as discussed below) or is a true Boolean value only (e.g. 'true'), this indicates that the schema will accept any value of any type. In this case processing continues to 204 where the TM 1216 generates and returns an ALL complete set as the set representation for the input schema.

An ALL complete set is a set representation indicating that the input schema accepts all values. Any appropriate data may be used to do this. By way of example, an ALL complete set may be represented as follows:

```
True
```

Example ALL complete set

Following 204 translation of the input schema is complete.

EMPTY Complete Set Generation

If, at 202, the TM 1216 initially determines that the input schema is a false Boolean value only (e.g. 'false'), this indicates that the schema will not accept any value of any type. In this case processing continues to 206 where the TM 1216 generates and returns the EMPTY complete set as the set representation for the input schema.

An EMPTY complete set is a set representation indicating that the input schema accepts no values. Any appropriate data may be used to do this. By way of example, an EMPTY complete set may be represented as follows:

```
False
```

Example EMPTY complete set

Following 206 translation of the input schema is complete.

SOME Complete Set Generation

If, at 202, the TM 1216 initially determines the input schema to be anything else (i.e. not undefined, not a Boolean that accepts only a true value or only a false value) processing continues 210. In this case the initial determination is that the input schema accepts some values. As discussed below, even if the initial determination is that that the input schema accepts some values further processing may identify that this is not in fact the case and the input schema actually accepts all values or does not accept any values. Given this, the initial determination at 202 that the input schema accepts some values can be considered an initial determination that the input schema is intended to accept some values.

At 210, the TM 1216 generates type sets for each type the translation process is configured to support. I.e., if the translation process is in respect of a JSON schema and supports all JSON schema types, then at 210 the TM 1216 generates a Boolean type set, a number type set, a string type set, a null type set, an object type set, and an array type set. Conversely, if the translation process only supports object and array types, then at 210 the TM 1216 generates an object type set and an array type set only. Throughout processing, each type set is populated with type set data indicating any constraints imposed on that particular type by the input schema.

Figure 3:
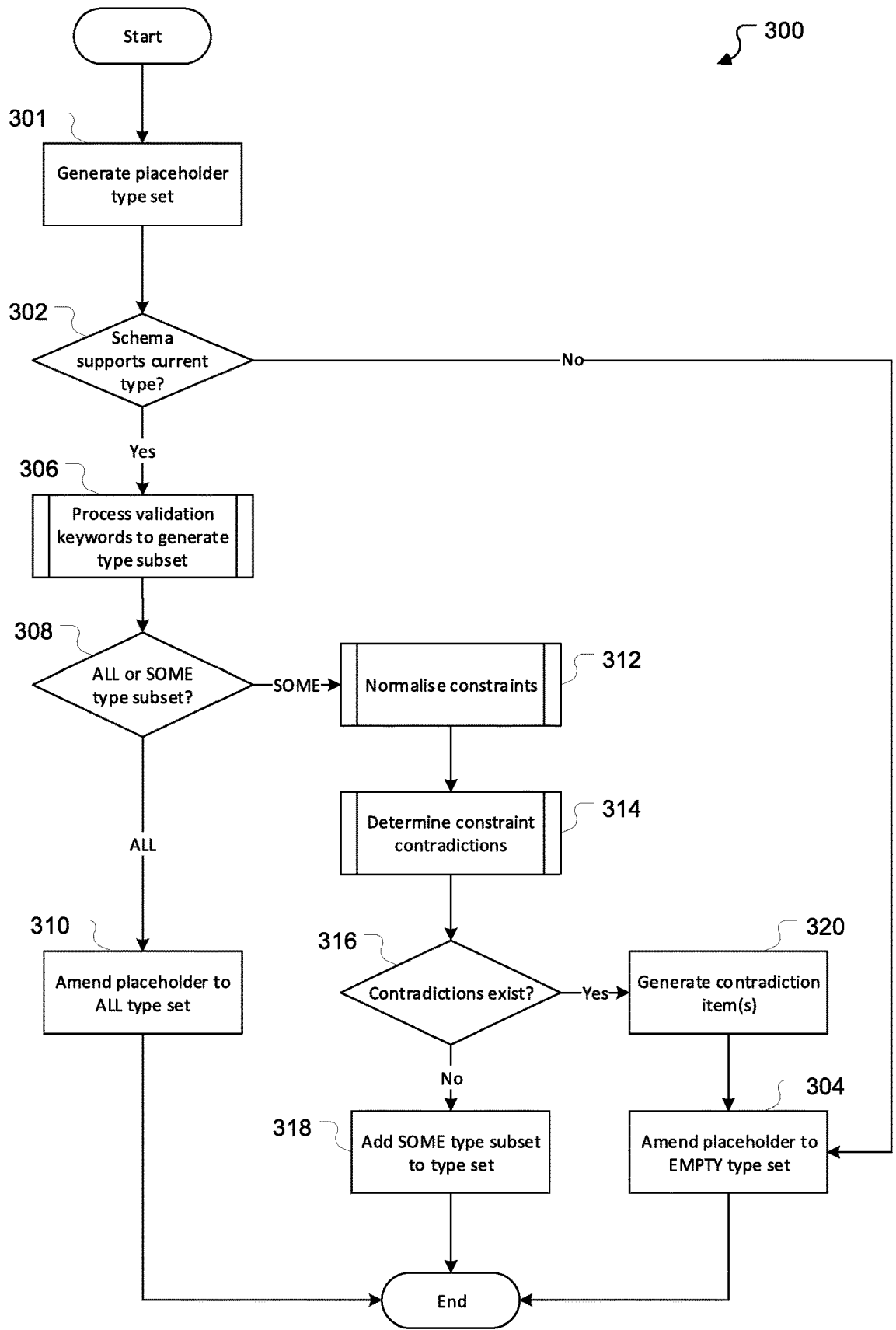
FIG. 3 is a flowchart illustrating processing performed by a computer processing system to generate type subsets.
Figure 4:
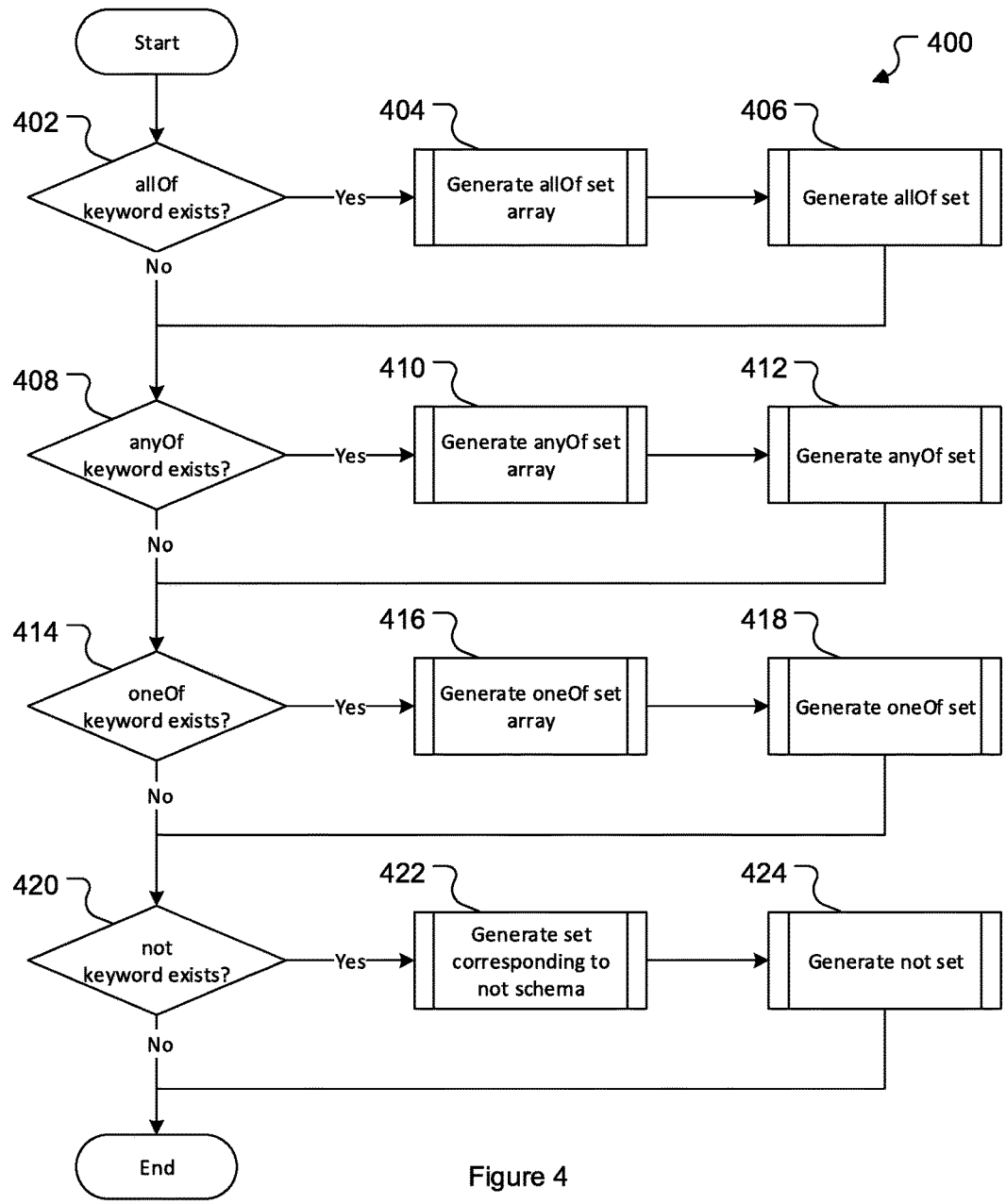
FIG. 4 is a flowchart illustrating processing performed by a computer processing system to process Boolean logic keywords.

Turning to FIG. 3, a type set generation process 300 will be described. In the present example, the TM 1216 invokes the type set generation process 300 once for each different type that is supported by translation process 200. The type generation process 300 is, therefore, performed in respect of a particular type (e.g. Boolean type set generation, number type set generation, string type set generation, null type set generation, object type set generation, array type set generation). The input to a given type set generation process is the same input schema being processed by the translation process 200 which calls the type set generation process.

Reference to a 'current' type in the context of process 300 is reference to the type of the particular type set being generated. For example, if process 300 is being performed to generate an object type set, the current type is object. Conversely, if process 300 is being performed to generate an array type set, the current type is array.

The type set generation process will also be described as being performed by the TM 1216, however could be performed by alternative systems or modules.

At 301, the TM 1216 generates a placeholder type set for the current type. The type set for a given type is an array which can be populated with zero or more type subsets of that type. E.g. an object type set is an array of zero or more object type subsets. Accordingly, generating a placeholder type set involves, in this example, generating an empty array.

At 302, the TM 1216 determines whether the input schema supports the current type. In the JSON context, this is achieved by inspecting the "type" keyword for the input schema to see whether it is the current type (in the event the type keyword has a string value defining a single type or an array value with a single element) or includes the current type (in the event the type keyword has an array value defining multiple types).

If, at 302, the input schema does not support the current type, processing proceeds to 304. At 304, the TM 1216 amends the placeholder typeset generated at 301 to an EMPTY type set of the current type. Processing for the current type then ends. Once processing for the current type ends, processing may either return to 301 (to generate type sets for other supported types that have not yet been processed) or to 212 (in the case that all types supported by the translation process have been processed).

If, at 302, the input schema does support the current type, processing proceeds to 306.

At 306, the TM 1216 processes constraint keywords for the current type to generate a type subset. The type subset is a set representation of constraints imposed on values of the current type by the input schema. In the JSON context, constraints for a given type are defined by validation keywords (validation keywords, therefore, being one example of constraint keywords), and different types have different validation keywords. Accordingly, the format of the type subsets generated by the TM 1216, and the processing performed to generate those type subsets, depends on the type in question.

Generally speaking, in order to generate a given type subset the TM 1216 determines whether each validation keyword supported by the translation process for that type is present. If a particular validation keyword is present in the input schema, the TM 1216 identifies the value of that keyword in the input schema and captures the constraint imposed by it. If a particular validation keyword is not present in the input schema, the TM 1216 generates and saves a default value for that keyword in the type subset being generated. Any default value can be used provided it is interpreted by the system in downstream processing (e.g. in performing set operations or set to schema translations) as indicating that no constraint is imposed by that keyword.

Processing various JSON validation keywords for different types is described further below.

As will be seen, in addition to the specific validation keywords supported by the translation process, a number of type subsets also include a 'not' array. The 'not' array is used to perform set operations (discussed further below) on type subsets. For a new type subset the value of the 'not' array is initially set to an empty array.

Object Type Subsets

In the present JSON input schema example, the object type validation keywords supported by the translation process are: additionalProperties, maxProperties, minProperties, properties, and required. In order to capture the constraints imposed by these validation keywords, the TM 1216 generates and populates (based on processing of the input JSON schema) an object type subset.

Various formats may be used for the object type subset. In the present embodiments, the TM 1216 generates and populates an object type subset object (ObjectSubsetConfig below) having the following format:

| Example object type subset format |
|---|
| ObjectSubsetConfig { <br>     additionalProperties: Set<'complete'>; <br>     maxProperties: number; <br>     minProperties: number; <br>     not: ObjectSubsetConfig[ ]; <br>     properties: ParsedPropertiesKeyword; <br>     required: string[ ]; <br> } |

The example object type subset includes a ParsedPropertiesKeyword object which is a map of keys to complete sets. An example format is:

| Example ParsedPropertiesKeyword object format |
|---|
| ParsedPropertiesKeyword { <br>     [key: string]: Set<'complete'>; <br> } |

When processing an input schema that defines the object type, the values generated and saved by the TM 1216 for a given object type subset are as follows:

| Example object type subset values | | |
|---|---|---|
| Validation keyword | Value if keyword defined in input schema | Default value if keyword not defined in input schema |
| additionalProperties | The input schema value will be a JSON schema. This JSON schema is translated (by a new translation process) and the translated schema is saved. | ALL complete set (e.g. true) |
| maxProperties | Value in input schema | Infinity |
| minProperties | Value in input schema | 0 |
| Not | NA | Empty array |
| Properties | The input schema value will be a map of keywords and associated JSON schemas. The TM 1216 iterates through each key/value pair of the input schema map. For each key/value pair the TM 1216 translates the JSON schema (by calling a new translation process) then records the keyword and translated complete set associated therewith in the ParsedPropertiesKeyword object | Empty object |
| Required | Value in input schema (an array of unique strings). | Empty array |

According to the JSON schema, object validation keywords also include patternProperties, dependencies, and propertyNames. In certain embodiments, the example object type subset object can be extended to capture constraints imposed by these additional validation keywords. Alternatively, the TM 1216 may be configured to either ignore these keywords or, on encountering one of these keywords, generate an error message as discussed above.

Array Type Subsets

In the present example, the array type validation keywords supported by the translation process are: items, maxItems, and minItems. In order to capture the constraints imposed by these validation keywords, the TM 1216 generates and populates (based on processing of the input JSON schema) an array type subset.

Various formats may be used for the array type subset. In the present embodiments, the TM 1216 generates and populates an array type subset object (ArraySubsetConfig below) having the following format:

| Example array type subset format |
|---|
| ArraySubsetConfig { <br>     items: Set<'complete'>; <br>     maxItems: number; <br>     minItems: number; <br>     not: ArraySubsetConfig[ ]; <br> } |

This example array type subset format assumes that the items validation keyword defines a single JSON schema rather than array with multiple JSON schemas. If the items validation keyword defines an array of JSON schemas with multiple elements, this can be handled in a similar manner to the properties and additional properties validation keywords (associated with objects) described above. For example, an additionalItems keyword can be provided that is handled in the same way as the additionalProperites keyword described above. Where items is an array with multiple elements it is handled the same way as properties. Specifically, each schema element of the items array is translated and stored in an object (key/value store), its associated key matching its index in the items array. When items is a single JSON schema it is stored in the additionalItems keyword (with the items keyword taking the default value—i.e. an empty object).

When processing an input schema that defines the array type, the values generated and saved by the TM 1216 for a given array type subset are as follows:

| | Example array type subset values | |
|---|---|---|
| Validation keyword | Value if keyword defined in input schema | Default value if keyword not defined in input schema |
| items | In the present example, the input schema value is either undefined or a single JSON schema. The JSON schema is translated (by a new translation process) and the translated schema saved. See above if items defines an array of JSON schemas with more than one element. | ALL complete set |
| maxItems | Value in input schema | Infinity |
| minItems | Value in input schema | 0 |
| Not | NA | Empty array |

According to the JSON schema, array validation keywords also include additionalItems, uniqueItems, and contains. In certain embodiments, the example array type subset object can be extended to capture constraints imposed by these additional validation keywords. Alternatively, the TM 1216 may be configured to either ignore these keywords or, on encountering one of these keywords, generate an error message as discussed above.

Number Type Subsets

In the present example, the number type validation keywords supported by the translation process are: maximum, exclusiveMaximum, minimum, and exclusiveMinimum. In order to capture the constraints imposed by these validation keywords, the TM 1216 generates and populates (based on processing of the input JSON schema) a number type subset.

Various formats may be used for the number type subset. In the present embodiments, the TM 1216 generates and populates a number type subset object (numberSubsetConfig below) having the following format:

| Example number type subset format |
|---|
| NumberSubsetConfig {<br>    maximum: number;<br>    exclusiveMaximum: number;<br>    minimum: number;<br>    exclusiveMinimum: number;<br>} |

As can be seen, no 'not' array is defined for the number type subset due to the fact that the complements of the constraints handled can be expressed by those constraints themselves. I.e. the complement of maximum can be expressed using exclusiveMinimum and vice-versa.

When processing an input schema that defines the number type, the values generated and saved by the TM 1216 for a given number type subset are as follows:

| | Example number type subset values | |
|---|---|---|
| Validation keyword | Value if keyword defined in input schema | Default value if keyword not defined in input schema |
| maximum | Value in input schema | NULL |
| exclusiveMaximum | Value in input schema | NULL |
| Minimum | Value in input schema | NULL |
| exclusiveMinimum | Value in input schema | NULL |

According to the JSON schema, number validation keywords also include multipleOf. In certain embodiments, the example string type subset object can be extended to capture constraints imposed by this additional validation keyword. Alternatively, the TM 1216 may be configured to either ignore this keyword or, on encountering this keyword, generate an error message as discussed above.

String Type Subsets

In the present example, the number type validation keywords supported by the translation process are maxLength and minLength. In order to capture the constraints imposed by these validation keywords, the TM 1216 generates and populates (based on processing of the input JSON schema) a string type subset.

Various formats may be used for the string type subset. In the present embodiments, the TM 1216 generates and populates a string type subset object (StringSubsetConfig below) having the following format:

| Example string type subset format |
|---|
| StringSubsetConfig {<br>    maxLength: number;<br>    minLength: number;<br>} |

As can be seen, no 'not' array is defined for the string type subset due to the fact that the complements of the constraints handled can be expressed by those constraints themselves. I.e. the complement of maxLength can be expressed using minLength and vice-versa.

When processing an input schema that defines the string type, the values generated and saved by the TM 1216 for a given array type subset are as follows:

| | Example string type subset values | |
|---|---|---|
| Validation keyword | Value if keyword defined in input schema | Default value if keyword not defined in input schema |
| maxLength | Value in input schema | Infinity |
| minLength | Value in input schema | 0 |

According to the JSON schema, string validation keywords also include pattern. In certain embodiments, the TM 1216 either ignores this keyword or, on encountering this keyword, generate an error message as discussed above.

At 308, the TM 1216 determines whether the type subset generated at 306 is an ALL subset (i.e. no constraints are imposed by the validation keywords) or a SOME subset (i.e. constrains are imposed by the validation keywords). If all values of the type subset generated at 306 are default values, the TM 1216 determines the type subset to be an ALL type subset. If one or more values of the type subset are not default values, the TM 1216 determines the type subset to be a SOME type subset.

If, at 308, the type subset generated at 306 is an ALL type subset, processing continues to 310. At 310, the TM 1216 amends the placeholder type set generated at 301 to an ALL type set for the current type. processing of the current type is complete.

Type Set Normalization

If, at 308, the type subset generated at 306 is a SOME type subset, processing continues to 312.

At 312, the TM 1216 processes the type subset generated at 306 to normalize certain constraints defined therein (if normalization is possible). In some instances it is possible to express the same semantic constraint in different ways. For certain constraints, therefore, the TM 1216 is configured to identify a constraint as one that can be expressed in various ways and, if that constraint is not expressed in a determined 'normal' manner the TM 1216 converts the constraint to a normal form.

The TM 1216 can be configured to perform normalization using a rule based methodology: i.e. if a constraint expressed in a defined way is identified it is replaced with a new constraint expressed in the defined normal way. By way of example, the TM 1216 may be configured to apply normalization rules such as:

| Example simplification rules | |
| --- | --- |
| If constraint identified | Replace with |
| If maxItems = 0 | Set maxItems to default (infinity) and change items to the EMPTY complete set |
| If maxProperties = 0 | Set maxProperties to default (infinity) and set additionalProperties to the EMPTY complete set |

Contradiction Detection

At 314, the TM 1216 processes the SOME type subset generated at 306 to identify any contradictions defined therein—i.e. any combinations of two or more validation keywords that define mutually exclusive constraints.

The TM 1216 can be configured to identify contradictions in various ways, for example using a rule based methodology (with rules based on the different types of constraints). Several example contradiction rules are provided below, however the TM 1216 can be configured to identify additional/fewer/alternative contradictions depending on implementation.

| Example contradiction rules | |
| --- | --- |
| Type | Contradiction if: |
| Number | maximum < minimum |
| String | maxLength < minLength |
| Object | maxProperties < minProperties |
| Array | maxItems < minItems |

The example contradiction rules are in respect of pairs of constraints. Contradiction rules could, however, involve the mutually exclusive interaction of three or more constraints.

At 316, the TM 1216 determines if any contradictions were identified at 314.

If, at 316, no contradictions have been identified, processing proceeds to 318. At 318, the TM 1216 adds the type subset generated at 308 (or, where normalization is performed, the normalized type subset generated at 312) to the placeholder type set generated at 301 and processing of the current type is complete. In this case the type subset is a SOME type subset.

If, at 316, one or more contradictions have been identified, processing proceeds to 320. At 320 the TM 1216 generates a contradiction item for each identified contradiction. The contradiction item(s) is/are returned, either immediately or at another point of the translation process (e.g. the end). Each contradiction item includes data in respect of the contradiction identified—e.g. the nature of the contradiction (e.g. that the maximum constraint is less than the minimum constraint) together with an indication of where the contradiction appears in the input schema (e.g. by a schema line number or other reference indicating where the contradiction exists).

Following 320, the process continues to 304 were the TM 1216 converts the placeholder type set generated at 301 to an EMPTY type set of the current type (the result of the identified contradiction being that no values for the type are accepted). Processing of the current type is then complete.

Returning to FIG. 2, once type sets have been generated for each type supported by the translation process, processing continues to 212.

At 212, the TM 1216 generates an interim complete set with the type sets generated at 210. The interim complete set has the same form as a SOME complete set as described above.

At 214, the TM 1216 performs a check on the interim complete set to determine if all type sets in the interim complete set are EMPTY type sets. If so, the interim complete set can be simplified to the EMPTY complete set. In this case processing proceeds to 206 where the TM 1216 generates and returns an EMPTY complete set.

Boolean Logic Keyword Processing

Following generation of the interim complete set at 212, processing continues to 216.

At 216, the TM 1216 determines whether the input schema defines any keywords for applying schemas with Boolean logic. In the JSON example these Boolean logic keywords are allOf, anyOf, oneOf, and not.

If the TM 1216 identifies one or more Boolean logic keywords processing continues to 218. If not processing continues to 222.

At 218, the TM 1216 processes each Boolean logic keyword to generate corresponding Boolean logic keyword sets (these are complete sets). Example processing performed at 218 is described with reference to process 400 of FIG. 4. Process 400 is in the JSON schema context and therefore refers to the JSON schema Boolean logic keywords allOf, anyOf, oneOf, and not.

In example process 400, the TM 1216 sequentially processes Boolean logic keywords in a particular order. The keywords could, however, be processed in an alternative order (and/or generation of the Boolean logic keyword complete sets could be performed in parallel).

At 402, the TM 1216 determines whether the allOf keyword exists in the input schema. If so processing proceeds to 404, if not processing continues to 408.

The value associated with the allOf keyword is a non-empty array of JSON Schemas. At 404 the TM 1216 generates an array of complete sets corresponding to the array JSON schemas defined by the allOf keyword. This will be referred to as the allOf set array. To generate the allOf set array, the TM 1216 iterates through the elements of the allOf array in the input schema, passing each JSON schema element to a new translation process (i.e. performing process 200 thereon) to generate the corresponding complete set. Accordingly, if a JSON schema includes the following:

"allOf": [{JSON schema 1},{JSON schema 2},{JSON schema 3}, . . . ,{JSON schema n}]

The TM 1216 calls a new translation process for each JSON schema element to generate the following allOf set array:

allOf set array=[{complete set 1},{complete set 2},{complete set 3}, . . . , {complete set n}]

At 406, the TM 1216 processes the allOf set array generated at 404 to generate a single complete set, which will be referred to as the allOf set. This involves performing set operations on the allOf set array to intersect all elements thereof—i.e.:

allOf set=((({complete set 1}∩{complete set 2})∩{complete set 3}) . . . ∩{complete set n})

The processing involved in calculating the intersection of two final sets is described below in the 'set operation' section.

Processing the allOf keyword is then complete, and processing continues to 408.

At 408, the TM 1216 determines whether the anyOf keyword exists. If so processing proceeds to 410, if not processing continues to 414.

The value associated with the anyOf keyword is also a non-empty array of JSON Schemas. At 410, the TM 1216 generates an array of complete sets corresponding to the array JSON schemas defined by the anyOf keyword. This will be referred to as the anyOf set array, and is generated in a similar manner to the allOf set array as described above. Accordingly, if a JSON schema includes the following:

"anyOf": [{JSON schema 1},{JSON schema 2},{JSON schema 3}, . . . ,{JSON schema n}]

The TM 1216 calls a new translation process for each JSON schema element to generate the following anyOf set array:

anyOf set array=[{complete set 1},{complete set 2},{complete set 3}, . . . ,{complete set n}]

At 412, the TM 1216 processes the anyOf set array generated at 410 to generate a single complete set, which will be referred to as the anyOf set. This involves performing set operations to calculate the union of all elements of the anyOf set array—i.e.:

anyOf set=((({complete set 1}U{complete set 2})U{complete set 3}) . . . U{complete set n})

The processing involved in calculating the union of two complete sets is described below.

Processing the anyOf keyword is then complete, and processing continues to 414.

At 414, the TM 1216 determines whether the oneOf keyword exists. If so processing proceeds to 416, if not processing continues to 420.

The value associated with the oneOf keyword is also a non-empty array of JSON Schemas. At 416, the TM 1216 generates an array of complete sets corresponding to the array JSON schemas defined by the oneOf keyword. This will be referred to as the oneOf set array, and is generated in a similar manner to the allOf set array as described above. Accordingly, if a JSON schema includes the following:

"oneOf": [{JSON schema 1},{JSON schema 2},{JSON schema 3}, . . . ,{JSON schema n}]

The TM 1216 calls a new translation process for each JSON schema element to generate the following oneOf set array:

oneOf set array=[{complete set 1},{complete set 2},{complete set 3}, . . . ,{complete set n}]

At 418, the TM 1216 processes the oneOf set array generated at 416 to generate a single complete set, which will be referred to as the oneOf complete set. In order to generate the one of complete set, the TM 1216 expands the elements of the one of complete set array into an equation involving union, intersection and complement operations and performs those operations.

Examples of equations for converting a oneOf set array into a single oneOf complete set are provided in the table below. In the table, each capital letter indicates a complete set (and normal set notation is used for operations: ∩ indicates intersection; U indicates union; ¬ indicates complement).

| Illustrative oneOf set generation equations | |
| --- | --- |
| oneOf set array | oneOf complete set= |
| [A] | {A} |
| [A, B] | { (A ∩ ¬B) U (¬A ∩ B) } |
| [A, B, C] | { (A ∩ ¬B ∩ ¬C) U (¬A ∩ B ∩ ¬C) U (¬A ∩ ¬B ∩ C) } |
| [A, B, C, D] | { (A ∩ ¬B ∩ ¬C ∩ ¬D) U (¬A ∩ B ∩ ¬C ∩ ¬D) U (¬A ∩ ¬B ∩ C ∩ ¬D) U (¬A ∩ ¬B ∩ ¬C ∩ D) } |
| [A, B, C, D, ..., n] | { (A ∩ ¬B ∩ ¬C ∩ ¬D ∩ ... ∩ ¬N) U (¬A ∩ B ∩ ¬C ∩ ¬D ∩ ... ∩ ¬N) U (¬A ∩ ¬B ∩ C ∩ ¬D ∩ ... ∩ ¬N) U (¬A ∩ ¬B ∩ ¬C ∩ D ∩ ... ∩ ¬N) U ... U (¬A ∩ ¬B ∩ ¬C ∩ ¬D ∩ ... ∩ N) } |

The processing involved in performing intersection, union, and complement operations is described below.

Processing the oneOf keyword is then complete, and processing continues to 420.

At 420, the TM 1216 determines whether the not keyword exists. If so processing proceeds to 422, if not process 400 and generation of Boolean keyword sets is complete.

The value associated with the not keyword is a single JSON schema. At 422, the TM 1216 generates a complete set corresponding to the JSON schema defined by the not keyword (e.g. by performing translation process 200 on the JSON schema defined by the not keyword).

At 424, the TM 1216 processes the complete set generated at 424 to generate a not set. This involves calculating the complement of the complete set generated at 424. The processing involved in calculating the complement of a complete set is described below.

Following 424, generation of Boolean keyword sets is complete.

Returning to FIG. 2, at 220, following generation of the Boolean logic keyword sets at 218, the TM 1216 updates the interim complete set (as generated at 212) using the one or more Boolean logic keyword sets. To do so, the TM 1216 calculates the intersection of the interim complete set generated at 212 and any Boolean logic keyword sets generated at 218—e.g.:

{updated interim complete set}=
{interim complete set}∩
{allOf set (if generated at 406)}∩

{anyOf set (if generated at 412)}∩
{oneOf set (if generated at 418)}∩
{not set (if generated at 424)}

The intersection set operation is described below.

Conditional Keyword Processing

At 222, the TM 1216 determines whether the input schema includes any operative conditional logic keywords. An operative conditional logic keyword in this sense is a conditional logic keyword that impacts the values accepted by the input schema. In the JSON context, the 'if' conditional logic keyword is an operative keyword, in the sense that if the 'if' keyword is not present any conditional logic 'then' or 'else' keywords have no effect. If an operative conditional logic keyword (e.g. 'if') is present, processing continues to 224. If not, processing continues to 228.

Continuing with the JSON context, If the 'if' keyword is used in the input schema, the TM 1216 processes it (and any other conditional logic keywords) at 224 and 226. Initially, at 224, the TM 1216 processes the conditional logic keywords to generate conditional logic keyword sets. Example processing performed at 224 is described with reference to process 500 of FIG. 5. At 226, the TM 1216 then updates the current form of the interim complete set (e.g. as generated at 212 and, if Boolean logic keywords are present, updated at 220) using the conditional logic keyword sets generated at 224.

Figure 5:
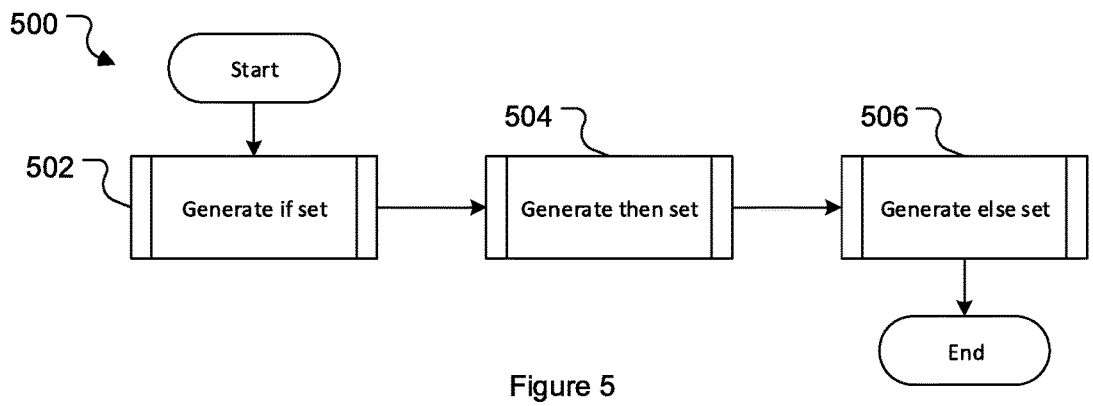
FIG. 5 is a flowchart illustrating processing performed by a computer processing system to process conditional logic keywords.

Turning to FIG. 5, in example process 500 the TM 1216 processes the conditional logic keyword(s) defined by the input schema (i.e. if, then, else) to generate a corresponding conditional logic keyword sets (these sets being complete sets).

Where present, the 'if' keyword defines a single JSON schema. At 502, the TM 1216 translates the JSON schema defined by the if keyword to generate a corresponding complete set which is saved as the if set. This is done by passing the schema defined by the if keyword as input to a new translation process (e.g. process 200) and saving the complete set generated by that process as the if set.

At 504, the TM 1216 generates a then complete set by calling a new translation process and saving the complete set resulting from that process as the then set. If the then keyword is present in the input schema it defines a single JSON schema which is passed as the input to the new translation process. If the then keyword is not present, the new translation process is called without an input (which results in an ALL complete set being generated/returned at 204).

At 506, the TM 1216 generates an else complete set by calling a new translation process and saving the complete set resulting from that process as the else set. If the else keyword is present in the input schema it defines a single JSON schema which is passed as the input to the new translation process. If the else keyword is not present, the new translation process is called without an input (which results in an ALL complete set being generated/returned at 204).

Process 500 and generation of conditional logic keyword sets is complete.

Returning to FIG. 2, at 226 the TM 1216 updates the current form of the interim complete set (as generated at 212 and, if Boolean logic keywords exist, updated at 220) using the conditional logic keyword sets as generated at 224 (i.e. the if set generated at 502, the then set generated at 504, and the else set generated at 506).

To do so, the TM 1216 calculates the following equation:

{updated interim complete set}=
{interim complete set}
∩
(({if set}∩{then set})U(¬{if set}∩{else set}))

Processing then continues to 228. At 228, the TM 1216 returns the current form of the interim complete set. Depending on the input schema and processing thereof, the current complete set at 228 may be: the interim complete set generated at 212 (in the case that no Boolean logic and no conditional logic keywords exist), or the interim complete set as updated at 220 (in the case one or more Boolean logic keywords exist) and/or at 222 (in the case that an operative conditional logic keyword exists). The complete set returned at 228 may be a SOME complete set, an ALL complete set, or an EMPTY complete set.

In certain implementations, the translation process 200 can be adapted to maintain tracking information the input schema is processed to generate the various sets (and constraints captured therein). The tracking data can then be used to map set representations back to the portions of the input schema (e.g. the various subschemas defined within the input schema) that resulted in their generation. As described below, this tracking information can be used in the coverage and support change notifications in order to highlight to a user portions of an input schema which (for example) have been determined to: contain a contradiction (e.g. in a coverage notification); accept all values (e.g. in a coverage notification); are new when compared to a source schema (e.g. in a support change notification); have been removed when compared to a destination schema (e.g. in a support change notification).

Performing Set Operations on Set Representations of Schemas

At various points in the schema translation process described above (and in the schema comparison process described below) set operations are performed. This section describes how set operations are performed.

In the example implementation described, set operations are performed by a set operation module (referred to as the SOM 1218 for short, for example set operation module 1218 as descried below). In alternative implementations set operations may be performed by an alternative module, application, or system.

As described above, translating a schema results in the generation of three different 'levels' of sets: a complete set (which is made up of type sets); type sets (which are each made up of zero or more type subsets); and type subsets.

Initially, set operations involving EMPTY and ALL sets are described (noting that these operations are the same regardless of the set level). Following this, set operations involving SOME sets are described for each set level (the complete set level, the type set level, and the type subset level).

EMPTY and ALL set operations

The following equations are used for all sets, whether at the complete set, type set, or type subset level.

When calculating the complement of an ALL set, the SOM 1218 generates and returns an EMPTY set:

¬{ALL}={EMPTY}

When calculating the complement of an EMPTY set, the SOM 1218 generates returns an ALL set:

¬{EMPTY}={ALL}

When calculating the intersection of an EMPTY set with any other set, the SOM 1218 generates and returns an EMPTY set:

{EMPTY}∩{EMPTY}={EMPTY}
{EMPTY}∩{SOME}={EMPTY}
{EMPTY}∩{ALL}={EMPTY}

When calculating the intersection of an ALL set with any other set, the SOM 1218 returns the other set:
{ALL}∩{EMPTY}={EMPTY}
{ALL}∩{SOME}={SOME}
{ALL}∩{ALL}={ALL}

When calculating the union of an ALL set with any other set, the SOM 1218 returns the ALL set:
{ALL}U{EMPTY}={ALL}
{ALL}U{SOME}={ALL}
{ALL}U{ALL}={ALL}

When calculating the union of an EMPTY set with any other set, the SOM 1218 returns the other set:
{EMPTY}U{EMPTY}={EMPTY}
{EMPTY}U{SOME}={SOME}
{EMPTY}U{ALL}={ALL}

SOME Set Operations: Complete Set Level

The complete set level operations will be described with reference to the following example complete sets:

| Example complete sets A and B | |
|---|---|
| complete set A | complete set B |
| { <br>   array: {array type set A}; <br>   boolean: {Boolean type set A}; <br>   null: {null type set A}; <br>   number: {number type set A}; <br>   object: {object type set A}; <br>   string: {string type set A} <br> } | { <br>   array: {array type set B}; <br>   boolean: {Boolean type set B}; <br>   null: {null type set B}; <br>   number: {number type set B}; <br>   object: {object type set B}; <br>   string: {string type set B} <br> } |

Complete Set: Complement Operation

When calculating the complement of a SOME complete set, the SOM 1218 calculates the complement of each individual type set comprised in the input SOME complete set and returns a new complete set including those complements. Calculating the complement of a type set is described below.

For example, the complement of complete set A is:

| Example complement of complete set A |
|---|
| ¬complete set A |
| { <br>   array: ¬{array type set A}; <br>   boolean: ¬{Boolean type set A}; <br>   null: ¬{null type set A}; <br>   number: ¬{number type set A}; <br>   object: ¬{object type set A}; <br>   string: ¬{string type set A} <br> } |

Complete Set: Intersection Operation

When calculating the intersection of two SOME complete sets, the SOM 1218 calculates the intersection of each pair of corresponding type sets from the two input sets and returns a new complete set including those intersections. Calculating the intersection of a type set is discussed below.

Continuing with the above example, the intersection of complete set A and complete set B is:

| Example intersection of complete sets A and B |
|---|
| {complete set A} ∩ {complete set B} |
| { <br>   array: ({array type set A} ∩ {array type set B}); <br>   boolean: ({Boolean type set A} ∩ {Boolean type set B}); <br>   null: ({null type set A} ∩ {null type set B}); <br>   number: ({number type set A} ∩ {number type set B}; <br>   object: ({object type set A} ∩ {object type set B}); <br>   string: ({string type set A} ∩ {string type set B}) <br> } |

Complete Set: Union Operation

When calculating the union of two SOME complete sets, the SOM 1218 calculates the union of each pair of corresponding type sets from the two input sets and returns a new complete set including those intersections. Calculating the union of a type set is discussed below.

Continuing with the above example, the intersection of complete set A and complete set B is:

| Example union of complete sets A and B |
|---|
| {complete set A} U {complete set B} |
| { <br>   array: ({array type set A} U {array type set B}); <br>   boolean: ({Boolean type set A} U {Boolean type set B}); <br>   null: ({null type set A} U {null type set B}); <br>   number: ({number type set A} U {number type set B}; <br>   object: ({object type set A} U {object type set B}); <br>   string: ({string type set A} U {string type set B}) <br> } |

SOME Set Operations: Type Set Level

As described above, each SOME type set is an array which includes one or more type subsets. Set operations at the type set level are described with reference to the following example type sets:

| Example type sets A and B | |
|---|---|
| Type set A | Type set B |
| [ <br>   {type subset A1}, <br>   {type subset A2}, <br>   ..., <br>   {type subset An} <br> ] | [ <br>   {type subset B1}, <br>   {type subset B2}, <br>   ..., <br>   {type subset Bn} <br> ] |

Type Set: Complement Operation

When calculating the complement of a SOME type set, the SOM 1218 initially calculates the complement of each type subset element of the input type set array. As described below, calculating the complement of a given type subset returns an array of type subsets—i.e.:

¬{type subset A1}={type subset A1-1},{type subset A1-2}, . . . ,{type subset A1-n}

Accordingly, and referring to example type subset A above, the result of this stage of the type set complement operation is an interim complement array which is, in fact, an array of type subset arrays:

| Example interim complement array |
|---|
| [<br>    [{type subset A1-1}, {type subset A1-2}, ... , {type subset A1-n}],<br>    [{type subset A2-1}, {type subset A2-2}, ... , {type subset A2-n}],<br>    ...<br>    [{type subset An-1}, {type subset An-2}, ... , {type subset An-n}]<br>] |

Following calculation of the complement of each type subset, the SOM 1218 calculates the Cartesian product of the interim complement array. This is done by progressively calculating Cartesian products of pairs of type subset arrays. E.g. calculating the Cartesian product (indicated ×) of {[A1], [A2], [A3],[A4]}=((([A1]×[A2])×[A3])×[A4]).

Continuing with the example, the Cartesian product of the interim complement of the A1 type subsets and A2 type subsets is:

| Example Cartesian product equation<br>for type set complement operation |
|---|
| [<br>  //Intersections of A1-1 with A2 type subsets:<br>    ({type subset A1-1} ∩ {type subset A2-1}),<br>    ({type subset A1-1} ∩ {type subset A2-2}),<br>    ...<br>    ({type subset A1-1} ∩ {type subset A2-n}),<br>  //Intersections of A1-2 with A2 type subsets<br>    ({type subset A1-2} ∩ {type subset A2-1}),<br>    ({type subset A1-2} ∩ {type subset A2-2}),<br>    ...<br>    ({type subset A1-2} ∩ {type subset A2-n}),<br>  //Intersections of A1-n with A2 type subsets<br>    ({type subset A1-n} ∩ {type subset A2-1}),<br>    ({type subset A1- n} ∩ {type subset A2-2}),<br>    ...<br>    ({type subset A1- n} ∩ {type subset A2-n}),<br>] |

Following calculation of the Cartesian product, the SOM 1218 determines if any of the type subsets generated contain contradictions. This determination can be done in the same or a similar manner to 316 as described above (for example using a rule based methodology). If any contradictions are detected in a particular type subset that type subset is converted to an EMPTY type subset. Unlike the determination of contradictions at 316 above, however, no contradiction item/error is raised on generation/detection of a contradiction while performing set operations.

The SOM 1218 then determines if the result of the Cartesian product equation (with any type subsets having contradictions converted to EMPTY type subsets) can be simplified.

If the SOM 1218 determines that any of the type subsets in the Cartesian product is an ALL type subset, the result of the complement is the ALL type set. In this case the SOM 1218 generates a new ALL type set and returns this as the result of the complement operation.

If the SOM 1218 determines that all of the type subsets in the Cartesian product are EMPTY type subsets, the result of the intersection is the EMPTY type set. In this case the SOM 1218 generates a new EMPTY type set and returns this as the result of the complement operation.

Otherwise, the SOM 1218 identifies and removes any EMPTY type sets and generates a new SOME type set (populated with any non-EMPTY subsets generated in the Cartesian product) and returns the new SOME type set as the result of the complement operation.

Type Set: Intersection Operation

When calculating the intersection of two SOME type sets, the SOM 1218 calculates the Cartesian product of the type subsets defined by the two input type sets.

Continuing with the above example, the Cartesian product of Type set A and Type set B is:

| Example Cartesian product equation for type set intersect operation<br>{Type set A} ∩ {Type set B}= |
|---|
| [<br>  //Intersections of type subset A1 type set B subsets<br>    ({type subset A1} ∩ {type subset B1}),<br>    ({type subset A1} ∩ {type subset B2}),<br>    ...<br>    ({type subset A1} ∩ {type subset Bn}),<br>  //Intersections of type subset A2 type set B subsets<br>    ({type subset A2} ∩ {type subset B1}),<br>    ({type subset A2} ∩ {type subset B2}),<br>    ...<br>    ({type subset A2} ∩ {type subset Bn}),<br>  //Intersections of type subset An type set B subsets<br>    ({type subset An} ∩ {type subset B1}),<br>    ({type subset An} ∩ {type subset B2}),<br>    ...<br>    ({type subset An} ∩ {type subset Bn})<br>] |

Following calculation of the Cartesian product, the SOM 1218 determines if any of the type subsets generated contain contradictions. This determination can be done in the same or a similar manner to 316 as described above (for example using a rule based methodology). If any contradictions are detected in a particular type subset that type subset is converted to an EMPTY type subset. Once again, any contradictions generated/detected during a set operation do not result in contradiction items/errors being raised.

Following calculation of the Cartesian product, the SOM 1218 determines if the result of the Cartesian product equation (with any type subsets having contradictions converted to EMPTY type subsets) can be simplified.

If the SOM 1218 determines that any of the type subsets in the Cartesian product is an ALL type subset, the result of the intersection is the ALL type set. In this case the SOM 1218 generates a new ALL type set and returns this as the result of the intersection operation.

If the SOM 1218 determines that all of the type subsets in the Cartesian product are EMPTY type subsets, the result of the intersection is the EMPTY type set. In this case the SOM 1218 generates a new EMPTY type set and returns this as the result of the intersection operation.

Otherwise, the SOM 1218 identifies and removes any EMPTY type sets and generates a new SOME type set (populated with any non-EMPTY subsets generated in the Cartesian product) and returns the new SOME type set as the result of the intersection operation.

Type Set: Union Operation

When calculating the union of two SOME type sets, the SOM 1218 generates a new type set and populates it with an array that includes all elements of the two type sets on which the union operation is being performed. The new type set is then returned Continuing with the above example, the union of type set A and type set B is:

| {Type set A} U {Type set B}= |
| --- |
| [<br>    {type subset A1},<br>    {type subset A2},<br>    ...,<br>    {type subset An},<br>    {type subset B1},<br>    {type subset B2},<br>    ...,<br>    {type subset Bn}<br>] |

SOME Set Operations: Type Subset Level

The manner in which type subset operations are performed depends on the type in question and the format of the type subsets.

SOME Set Operations: Object Type Subsets

As discussed above, in the present example the object type subset format is as follows:

```
ObjectSubsetConfig {
    additionalProperties: Set<'complete'>;
    maxProperties: number;
    minProperties: number;
    not: ObjectSubsetConfig[ ];
    properties: ParsedPropertiesKeyword;
    required: string[ ];
}
```

The example ParsedPropertiesKeyword object format is:

```
ParsedPropertiesKeyword {
    [key: string]: Set<'complete'>;
}
```

The object type subset operations will be described with reference to the following example type subsets:

Object Type Subset: Complement Operation

When calculating the complement of an object type subset (e.g. object type subset A), the SOM 1218 processes each of the object type subset keywords separately. The processing of each object type subset keyword generates one or more new object type subsets.

To illustrate why the complement of a single type subset may result in several new type subsets, consider, for example, a simple numeric constraint that a number x must be between 1 and 10 (minimum 1, maximum 10). The complement of this constraint is a first set in which x is any number less than 1 (i.e. a maximum of 0) and a second set in which x is any number greater than 10 (i.e. a minimum of 11).

The processing of each object type subset keyword is described below.

Once each keyword has been processed, the SOM 1218 generates a new array of all object type subsets generated in processing the keywords. Following generation of this array, the SOM 1218 determines if any type subsets have contradictions (as described above, in which case the given type subset is replaced with an EMPTY type subset) and whether simplification is possible (as described above). The SOM 1218 then returns the array as the result of the object type subset complement operation.

Object Type Subset: Complement Operation: additionalProperties Keyword

To process the additionalProperties keyword when calculating the complement of an object type subset the SOM 1218 generates a new object type subset in which all values are default except the 'not' value. The 'not' value of the new object type subset is itself a new object type subset in which: the additionalProperties value is the additionalPropeties value of the input set; the properties value is the properties value of the input set; all other values are default.

Continuing with the example object type subset A discussed above, the new object type subset generated based on the additionalProperties keyword is:

```
New object type subset {
    additionalProperties: {ALL complete set}
    maxProperties: infinity;
    minProperties: 0;
    not: [
```

| Object type subset A | Object type subset B |
| --- | --- |
| ObjectSubsetConfig {<br>  additionalProperties: {addProp complete set A);<br>  maxProperties: maxA;<br>  minProperties: minA;<br>  not: [<br>    {notObjectSubsetA1},<br>    {notObjectSubsetA2},<br>    ...,<br>    {notObjectSubsetAn}<br>  ];<br>  properties: {<br>    "A1":{prop complete set A1},<br>    "A2":{prop complete set A2),<br>    ...,<br>    "An":{prop complete set An}<br>  };<br>  required: ["req A1", "req A2", ..., "req An"]<br>} | ObjectSubsetConfig {<br>  additionalProperties: {addProp complete set B};<br>  maxProperties: maxB;<br>  minProperties: minB;<br>  not: [<br>    {notObjectSubsetB1},<br>    {notObjectSubsetB2},<br>    ...,<br>    {notObjectSubsetBn}<br>  ];<br>  properties: {<br>    "B1":{prop complete set B1},<br>    "B2":{prop complete set B2},<br>    ...,<br>    "Bn":{prop complete set Bn}<br>  };<br>  required: ["req B1", "req B2", ..., "req Bn"]<br>} |

```
{
    additionalProperties: {addProp complete set A};
    maxProperties: infinity;
    minProperties: 0;
    not: [ ];
    properties: {
        "A1":{prop complete set A1},
        "A2":{prop complete set A2},
        ...,
        "An":{prop complete set An}
    };
    Required: [ ]
    }
];
properties: { };
required: [ ]
}
```

Example New Object Type Subset Generated from additionalProperties Keyword

Object type subset: complement operation: maxProperties keyword

To process the maxProperties keyword when calculating the complement of an object type subset, the SOM 1218 generates a new object type subset having a minProperties value equal to the maxProperties value of the input set plus 1. All other values of the new type subset are default values (indicating no constraint).

Continuing with the example object type subset A discussed above, the new object type subset generated based on the maxProperties keyword is:

| Example new object type subset generated from maxProperties keyword |
|---|
| New Object type subset { <br> additionalProperties: {ALL complete set}; <br> maxProperties: infinity; <br> minProperties: maxA + 1; <br> not: [ ]; <br> properties: { }; <br> required: [ ] <br> } |

Object Type Subset: Complement Operation: minProperties Keyword

To process the minProperties keyword when calculating the complement of an object type subset, the SOM 1218 generates a new object type subset having a maxProperties value equal to the minProperties value of the input set minus 1. All other values of the new type subset are default values (indicating no constraint).

Continuing with the example object type subset A discussed above, the new object type subset generated based on the minProperties keyword is:

| Example new object type subset generated from minProperties keyword |
|---|
| New object type subset { <br> additionalProperties: {ALL complete set}; <br> maxProperties: minA − 1; <br> minProperties: 0; <br> not: [ ]; <br> properties: { }; <br> required: [ ] <br> } |

Object Type Subset: Complement Operation: Not Keyword

To process the not keyword when calculating the complement of an object type subset, the SOM 1218 generates a new object type subset for each element of the not array of the input.

Continuing with the example object type subset A discussed above, the new object type subsets generated based on the not keyword are:

| Example new object type subsets generated from not keyword |
|---|
| {notObjectSubsetA1} <br> {notObjectSubsetA2} <br> ... <br> {notObjectSubsetAn} |

Object Type Subset: Complement Operation: Properties Keyword

To process the properties keyword when calculating the complement of an object type subset, the SOM 1218 generates new object type subsets for each key defined in the input map.

The new object type subset generated for a given key includes a properties map with a key/value pair having: the given key; and a value equal to the complement of the complete set for that key. Furthermore, the new object type subset is generated such that the required keyword defines the given key. All other values of the new type subsets are default values (indicating no constraint).

Continuing with the example object type subset A discussed above, the new object type subsets generated based on the properties keyword are:

| Example new object type subsets generated from properties keyword |
|---|
| New object type subset based on properties "A1" { <br> additionalProperties: {ALL complete set}; <br> maxProperties: infinity; <br> minProperties: 0; <br> not: [ ]; <br> properties: { <br>     "A1": (¬{prop complete set A1}) <br> }; <br> required: ["A1"] <br> } <br> New object type subset based on properties "A2" { <br> additionalProperties: {ALL complete set}; <br> maxProperties: infinity; <br> minProperties: 0; <br> not: [ ]; <br> properties: { <br>     "A2": (¬{prop complete set A2}) <br> }; <br> required: ["A2"] <br> } <br> New object type subset based on properties "An" { <br> additionalProperties: {ALL complete set}; <br> maxProperties: infinity; <br> minProperties: 0; |

| Example new object type subsets generated from properties keyword |
|---|
| not: [ ];<br>properties: {<br>    "An": (¬{prop complete set An})<br>};<br>required: ["An"]<br>} |

Object Type Subset: Complement Operation: Required Keyword

To process the required keyword when calculating the complement of an object type subset, the SOM 1218 generates new object type subsets for each string in the required array of the input object type subset.

Each new object type subset created from a given string includes a properties map having a key/value pair with the key set to the string that engendered creation of the object type subset and the corresponding value set to the EMPTY complete set (i.e. there is no valid value for that property). All other values of the new type subsets are default values (indicating no constraint).

Continuing with the example object type subset A discussed above, the new object type subsets generated based on the required keyword are:

| Example new object type subsets generated from properties keyword |
|---|
| New object type subset based on reqA1: {<br>    additionalProperties: {ALL complete set};<br>    maxProperties: infinity;<br>    minProperties: 0;<br>    not: [ ];<br>    properties: {<br>        "req A1":{EMPTY complete set}<br>    };<br>    required: [ ]<br>}<br>New object type subset based on reqA2: {<br>    additionalProperties: {ALL complete set};<br>    maxProperties: infinity;<br>    minProperties: 0;<br>    not: [ ];<br>    properties: {<br>        "req A2":{EMPTY complete set}<br>    };<br>    required: [ ]<br>}<br>New object type subset based on reqAn: {<br>    additionalProperties: {ALL complete set};<br>    maxProperties: infinity;<br>    minProperties: 0;<br>    not: [ ];<br>    properties: {<br>        "req An":{EMPTY complete set}<br>    };<br>    required: [ ]<br>} |

Object Type Subset: Intersect Operation

Calculating the intersection of two object type subsets (e.g. object type subsets A and B) results in a new object type subset. To generate the new object type subset the SOM 1218 processes each of the object type subset keywords separately in order to generate a value for that keyword in the new object type subset.

The processing of each object type subset keyword is described below.

Object Type Subset: Intersection Operation: additionalProperties Keyword

To process the additionalProperties keyword when calculating the intersection of two object type subsets, the SOM 1218 generates a new complete set that is the intersection of the two additionalProperties complete sets from the input object type subsets.

Continuing with the example object type subsets A and B above, the additionalProperties value for the new object type subset is:

New additionalProperties={addProp complete set A}∩{addProp complete set B}

Object Type Subset: Intersect Operation: maxProperties Keyword

To process the maxProperties keyword when calculating the intersection of two object type subsets, the SOM 1218 generates a new maxProperties value equal to the smaller of the two maxProperties values of the input object type subsets.

Continuing with the example object type subsets A and B above, the maxProperties value for the new object type subset is, for example:

if (maxA<=maxB), new maxProperties=maxA
else new maxProperties=max B

Object Type Subset: Intersect Operation: minProperties Keyword

To process the minProperties keyword when calculating the intersection of two object type subsets, the SOM 1218 generates a new minProperties value equal to the larger of the two minProperties values of the input object type subsets.

Continuing with the example object type subsets A and B above, the minProperties value for the new object type subset is, for example:

if (minA>=minB), new minProperties=minA
else new minProperties=min B

Object Type Subset: Intersect Operation: Not Keyword

To process the not keyword when calculating the intersection of two object type subsets, the SOM 1218 generates a new array of object type subsets by merging the two not arrays of the input object type subsets.

Continuing with the example object type subsets A and B above, the not value for the new object type subset is:

not: [{notObjetSubsetA1}, {notObjectSubsetA2}, . . . , {notObjectSubsetAn}, {notObjectSubsetB1}, {notObjectSubsetB2}, . . . , {notObjectSubsetBn}]

Object Type Subset: Intersect Operation: Properties Keyword

To process the properties keyword when calculating the intersection of two object type subsets, the SOM 1218 initially generates a list of all unique keys appearing in properties map of object subset A and properties map of subset B (e.g. by creating a list of all keys and removing duplicates).

Continuing with the example object type subsets A and B above, the list of unique keys is:

["A1", "A2", . . . , "An", "B1", "B2", . . . , "Bn"]

The SOM 1218 then generates two new properties map (initially empty) and populates it with each of the unique keys. For a given key, the corresponding value is generated by calculating the intersection a first input schema value for the key (e.g. an object type subset A value for the key) and a second input schema value for the key (e.g. an object type subset B value for the key).

The first input schema value for a given key is calculated as follows. If the given key appears in the properties map of the first object type subset (e.g. object type subset A), the first input schema value for that key is the value defined for that key in the properties map of the first object type subset. If the given key does not appear in the properties map of the first object type subset, the first input schema value for that key is the value defined by the additional properties keyword of the first object type subset (noting this is assigned a default value of ALL in the event it is not defined by the input schema from which the first object type subset was generated).

Similarly, the second input schema value for a given key is calculated as follows. If the given key appears in the properties map of the second object type subset (e.g. object type subset B), the second input schema value for the key is the value defined for that key in the properties map of the second object type subset. If the given key does not appear in the properties map of the second object type subset, the second input schema value for that key is the value defined by the additional properties keyword of the second object type subset (noting this is assigned a default value of ALL in the event it is not defined by the input schema from which the second object type subset was generated).

Continuing with the example, therefore, the new properties map generated for the intersection of object type subsets A and B is:

| Example properties map for new object type subset |
|---|
| properties:{<br>    "A1":({prop complete set A1} ∩ {addProp complete set B}),<br>    "A2":({prop complete set A2} ∩ {addProp complete set B}),<br>    ...,<br>    "An":({prop complete set An} ∩ {addProp complete set B}),<br>    "B1":({addProp complete set A} ∩ {prop complete set B1}),<br>    "B2":({addProp complete set A} ∩ {prop complete set B2}),<br>    ...,<br>    "Bn":({addProp complete set A} ∩ {prop complete set Bn})<br>} |

Object Type Subset: Intersect Operation: Required Keyword

To process the required keyword when calculating the intersection of two array type subsets, the SOM 1218 generates a new array including all unique elements of the two required arrays of the input object type subsets (i.e. by merging the arrays and removing any duplicate strings).

Continuing with the example object type subsets A and B above, the required value for the new object type subset is:
    required: ["req A1", "req A2", . . . , "req An", "req B1", "req B2", . . . , "req Bn"]

Object Type Subset: Union Operation

As described above, the SOM 1218 calculates the union of two type sets by generating a new array that includes all elements from the two type sets input. Accordingly, there is no requirement for a union operation performed at the type subset level.

SOME Set Operations: Array Type Subsets

As discussed above, in the present example the array type subset format is as follows:

| |
|---|
| ArraySubsetConfig {<br>    items: Set<'COMPELTE'>;<br>    maxItems: number;<br>    minItems: number;<br>    not: ArraySubsetConfig[ ];<br>} |

The array type subset operations will be described with reference to the following example type subsets:

| Array subset A | Array subset B |
|---|---|
| ArraySubsetA {<br>  items: {items complete Set A};<br>  maxItems: maxA;<br>  minItems: minA;<br>  not: [<br>    {notArraySubsetA1}, {notArraySubsetA2},<br>    ..., {notArraySubsetAn}<br>  ]<br>} | ArraySubsetB {<br>  items: {items complete Set B};<br>  maxItems: maxB;<br>  minItems: minB;<br>  not: [<br>    {notArraySubsetB1}, {notArraySubsetB2}, ...,<br>    {not ArraySubsetBn}<br>  ]<br>} |

Array Type Subset: Complement Operation

When calculating the complement of an array type subset (e.g. array type subset A), the SOM 1218 processes each of the array type subset keywords separately. The processing of each array type subset keyword generates one or more new array type subsets.

The processing of each array type subset keyword is described below.

Once each keyword has been processed, the SOM 1218 generates a new array of all array type subsets generated in processing the keywords. Following generation of this array, the SOM 1218 determines if any type subsets have contradictions (as described above, in which case the given type subset is replaced with an EMPTY type subset) and whether simplification is possible (as described above). The SOM 1218 then returns the array as the result of the array type subset complement operation.

Array Type Subset: Complement Operation: Items Keyword

To process the items keyword when calculating the complement of an array type subset the SOM 1218 generates a new array type subset with all values except the 'not' value being default. The 'not' value of the new array type subset is itself an array type subset in which the items value is the items value from the input set and all other values are default.

Continuing with the example item type subset A discussed above, the new item type subset generated based on the items keyword is:

| Example new array type subset generated from items keyword |
|---|
| New array type subset {<br>    items: {ALL complete set}<br>    maxItems: infinity;<br>    minItems: 0;<br>    not: [<br>        {<br>            items: {items complete Set A};<br>            maxItems: infinity;<br>            minItems: 0;<br>            not: [ ]<br>        }<br>    ]<br>} |

Array Type Subset: Complement Operation: maxItems Keyword

To process the maxItems keyword when calculating the complement of an array type subset, the SOM 1218 generates a new array type subset having a minItems value equal to the maxItems value of the input set plus 1. All other values of the new type subset are default values (indicating no constraint).

Continuing with the example array type subset A discussed above, the new array type subset generated based on the maxItems keyword is:

| Example new array type subset generated from maxItems keyword |
|---|
| newArrayTypeSubset {<br>    items: {ALL complete set};<br>    maxItems: infinity;<br>    minItems: maxA + 1;<br>    not: [ ]<br>} |

Array Type Subset: Complement Operation: minItems Keyword

To process the minItems keyword when calculating the complement of an array type subset, the SOM 1218 generates a new array type subset having a maxItems value equal to the minItems value of the input set minus 1. All other values of the new type subset are default values (indicating no constraint).

Continuing with the example array type subset A discussed above, the new array type subset generated based on the minItems keyword is:

| Example new array type subset generated from minItems keyword |
|---|
| newArrayTypeSubset {<br>    items: {ALL complete set};<br>    maxItems: minA - 1;<br>    minItems: 0;<br>    not: [ ]<br>} |

Array Type Subset: Complement Operation: Not Keyword

To process the not keyword when calculating the complement of an array type subset, the SOM 1218 generates a new array type subset for each element of the not array of the input.

Continuing with the example array type subset A discussed above, the new array type subsets generated based on the not keyword are:

| Example new array type subsets generated from not keyword |
|---|
| {notArraySubsetA1}<br>{notArraySubsetA2}<br>...<br>{notArraySubsetAn} |

Array Type Subset: Intersection Operation

Calculating the intersection of two array type subsets (e.g. array type subsets A and B) results in a new array type subset. To generate the new array type subset the SOM 1218 processes each of the array type subset keywords separately in order to generate a value for that keyword in the new array type subset.

The processing of each array type subset keyword is described below.

Array Type Subset: Intersection Operation: Items Keyword

To process the items keyword when calculating the intersection of two array type subsets, the SOM 1218 generates a new complete set that is the intersection of the two items complete sets from the input array type subsets.

Continuing with the example array type subsets A and B above, the items value for the new array type subset is:

items: {items complete set A}∩{items complete set B}

Array Type Subset: Intersect Operation: maxItems Keyword

To process the maxItems keyword when calculating the intersection of two array type subsets, the SOM 1218 generates a new maxItems value equal to the smaller of the two maxItems values of the input array type subsets.

Continuing with the example array type subsets A and B above, the maxItems value for the new array type subset is, for example:

if (maxA<=maxB), new maxItems=maxA
else new maxItems=max B

Array Type Subset: Intersect Operation: minItems Keyword

To process the minItems keyword when calculating the intersection of two array type subsets, the SOM 1218 generates a new minItems value equal to the larger of the two minItems values of the input array type subsets.

Continuing with the example array type subsets A and B above, the minItems value for the new array type subset is, for example:

if (minA>=minB), new minItems=minA
else new minItems=min B

Array Type Subset: Intersect Operation: Not Keyword

To process the not keyword when calculating the intersection of two array type subsets, the SOM 1218 generates a new array of array type subsets by merging the two not arrays of the input array type subsets.

Continuing with the example array type subsets A and B above, the not value for the new array type subset is:

not: [{notArraySubsetA1}, {notArraySubsetA2}, . . . , {notArraySubsetAn}, {notArraySubsetB1}, {notArraySubsetB2}, . . . , {notArraySubsetBn}]

Array Type Subset: Union Operation

As noted above, because the SOM 1218 calculates the union of two type sets by generating a new array that includes all elements from the two type sets input there is no requirement for a union operation performed at the type subset level.

Some Set Operations: Number Type Subsets

As discussed above, in the present example the number type subset format is as follows:

| Example number type subset format |
| --- |
| NumberSubsetConfig {<br>    maximum: number;<br>    exclusiveMaximum: number;<br>    minimum: number;<br>    exclusiveMinimum: number;<br>} |

The number type subset operations will be described with reference to the following example type subsets:

| Number subset A | Number subset B |
| --- | --- |
| NumberSubsetA {<br>    maximum: maxA;<br>    exclusiveMaximum: exMaxA;<br>    minimum: minA;<br>    exclusiveMinimum: exMinA;<br>} | NumberSubsetB {<br>    maximum: maxB;<br>    exclusiveMaximum: exMaxB;<br>    minimum: minA;<br>    exclusiveMinimum: exMinB:<br>} |

Number Type Subset: Complement Operation

When calculating the complement of a number type subset (e.g. number type subset A), the SOM 1218 processes each of the number type subset keywords separately. The processing of each number type subset keyword generates one or more new number type subsets.

The processing of each number type subset keyword is described below.

Once each keyword has been processed, the SOM 1218 generates a new array of all number type subsets generated in processing the keywords. Following generation of this array, the SOM 1218 determines if any type subsets have contradictions (as described above, in which case the given type subset is replaced with an EMPTY type subset) and whether simplification is possible (as described above). The SOM 1218 then returns the array as the result of the number type subset complement operation.

Number Type Subset: Complement Operation: Maximum Keyword

To process the maximum keyword when calculating the complement of a number type subset, the SOM 1218 generates a new number type subset having an exclusiveMinimum value equal to the input's maximum value. All other values of the new type subset are default values. E.g.:

| |
| --- |
| newNumberTypeSubset {<br>    maximum: NULL;<br>    exclusiveMaximum: NULL;<br>    minimum: NULL;<br>    exclusiveMinimum: maxA;<br>} |

Example New Number Type Subset Generated from Maximum Keyword

Number Type Subset: Complement Operation: exclusiveMaximum Keyword

To process the exclusiveMaximum keyword when calculating the complement of a number type subset, the SOM 1218 generates a new number type subset having a minimum value equal to the input's exclusiveMaximum value. All other values of the new type subset are default values. E.g.:

| |
| --- |
| newNumberTypeSubset {<br>    maximum: NULL;<br>    exclusiveMaximum: NULL;<br>    minimum: exMaxA;<br>    exclusiveMinimum: NULL;<br>} |

Example New Number Type Subset Generated from exclusiveMaximum Keyword

Number Type Subset: Complement Operation: Minimum Keyword

To process the minimum keyword when calculating the complement of a number type subset, the SOM 1218 generates a new number type subset having an exclusiveMaximum value equal to the input's minimum value. All other values of the new type subset are default values. E.g.:

| |
| --- |
| newNumberTypeSubset {<br>    maximum: NULL;<br>    exclusiveMaximum: minA;<br>    minimum: NULL;<br>    exclusiveMinimum: NULL;<br>} |

Example New Number Type Subset Generated from Minimum Keyword

Number Type Subset: Complement Operation: exclusiveMinimum Keyword

To process the exclusiveMinimum keyword when calculating the complement of a number type subset, the SOM 1218 generates a new number type subset having a maximum value equal to the input's exclusiveMinimum value. All other values of the new type subset are default values. E.g.:

| |
| --- |
| newNumberTypeSubset {<br>    maximum: exMinA;<br>    exclusiveMaximum: NULL;<br>    minimum: NULL;<br>    exclusiveMinimum: NULL;<br>} |

Example New Number Type Subset Generated from exclusiveMinimum Keyword

Number Type Subset: Intersection Operation

Calculating the intersection of two number type subsets (e.g. number type subsets A and B) results in a new number type subset. To generate the new number type subset the SOM 1218 processes each of the number type subset keywords separately in order to generate a value for that keyword in the new number type subset.

The processing of each number type subset keyword is described below.

Number Type Subset: Intersect Operation: Maximum Keyword

To process the maximum keyword when calculating the intersection of two number type subsets, the SOM 1218 generates a new maximum value equal to the smaller of the two maximum values of the input number type subsets.

Continuing with the example number type subsets A and B above, the maximum value for the new number type subset is, for example:

if (maxA<=maxB), new maximum=maxA else new maximum=maxB

Number Type Subset: Intersect Operation: exclusiveMaximum Keyword

To process the exclusiveMaximum keyword when calculating the intersection of two number type subsets, the SOM 1218 generates a new exclusiveMaximum value equal to the smaller of the two exclusiveMaximum values of the input number type subsets.

Continuing with the example number type subsets A and B above, the exclusiveMaximum value for the new number type subset is, for example:

if (exMaxA<=exMaxB), new exclusiveMaximum=exMaxA else new exclusiveMaximum=exMaxB Number Type Subset: Intersect Operation: Minimum Keyword To process the minimum keyword when calculating the intersection of two number type subsets, the SOM 1218 generates a new minimum value equal to the larger of the two minimum values of the input number type subsets.

Continuing with the example number type subsets A and B above, the minimum value for the new number type subset is, for example:

if (minA>=minB), new minimum=minA else new minimum=minB

Number Type Subset: Intersect Operation: exclusiveMinumum Keyword

To process the exclusiveMinumum keyword when calculating the intersection of two number type subsets, the SOM 1218 generates a new exclusiveMinumum value equal to the larger of the two exclusiveMinumum values of the input number type subsets.

Continuing with the example number type subsets A and B above, the exclusiveMinumum value for the new number type subset is, for example:

if (exMinA>=exMinB), new exclusiveMinimum=exMinA else new exclusiveMinimum=exMinB Number Type Subset: Union Operation As noted above, because the SOM 1218 calculates the union of two type sets by generating a new array that includes all elements from the two type sets input there is no requirement for a union operation performed at the type subset level.

Some Set Operations: String Type Subsets

As discussed above, in the present example the number type subset format is as follows:

```
StringSubsetConfig {
    maxLength: number;
    minLength: number;
}
```

Example String Type Subset Format

The string type subset operations will be described with reference to the following example type subsets:

| String subset A | String subset B |
|---|---|
| StringSubsetA {<br>    maxLength: maxA;<br>    minLength: minA;<br>} | StringSubsetB {<br>    maxLength: maxB;<br>    minLength: minB;<br>} |

String Type Subset: Complement Operation

When calculating the complement of a string type subset (e.g. string type subset A), the SOM 1218 processes each of the string type subset keywords separately. The processing of each string type subset keyword generates one or more new string type subsets.

The processing of each string type subset keyword is described below.

Once each keyword has been processed, the SOM 1218 generates a new array of all string type subsets generated in processing the keywords. Following generation of this array, the SOM 1218 determines if any type subsets have contradictions (as described above, in which case the given type subset is replaced with an EMPTY type subset) and whether simplification is possible (as described above). The SOM 1218 then returns the array as the result of the string type subset complement operation.

String Type Subset: Complement Operation: maxLength Keyword

To process the maxLength keyword when calculating the complement of a string type subset, the SOM 1218 generates a new string type subset having a minLength value equal to the maxLength value of the input set plus 1. The maxLength value is set to default (infinity).

Continuing with the example string type subset A discussed above, the new string type subset generated based on the maxLength keyword is:

```
newStringSubset {
    maxLength: infinity;
    minLength: maxA + 1;
}
```

Example New String Type Subset Generated from maxLength Keyword

String Type Subset: Complement Operation: minLength Keyword

To process the minLength keyword when calculating the complement of a string type subset, the SOM 1218 generates a new string type subset having a maxLength value equal to the minLength value of the input set minus 1. The minLength value is set to default (0).

Continuing with the example string type subset A discussed above, the new string type subset generated based on the maxLength keyword is:

```
newStringSubset {
    maxLength: minA - 1;
    minLength: 0;
}
```

Example New String Type Subset Generated from minLength Keyword

String Type Subset: Intersection Operation

Calculating the intersection of two string type subsets (e.g. string type subsets A and B) results in a new string type subset. To generate the new string type subset the SOM 1218 processes each of the string type subset keywords separately in order to generate a value for that keyword in the new string type subset.

The processing of each string type subset keyword is described below.

String Type Subset: Intersect Operation: maxLength Keyword

To process the maxLength keyword when calculating the intersection of two string type subsets, the SOM 1218 generates a new maxLength value equal to the smaller of the two maxLength values of the input string type subsets.

Continuing with the example string type subsets A and B above, the maxLength value for the new string type subset is, for example:

if (maxA<=maxB), new maxLength=maxA
else new maxLength=maxB

String Type Subset: Intersect Operation: minLength Keyword

To process the minLength keyword when calculating the intersection of two string type subsets, the SOM 1218 generates a new minLength value equal to the larger of the two minLength values of the input string type subsets.

Continuing with the example string type subsets A and B above, the minLength value for the new string type subset is, for example:

if (minA>=minB), new minLength=minA
else new minLength=minB

String Type Subset: Union Operation

As noted above, because the SOM 1218 calculates the union of two type sets by generating a new array that includes all elements from the two type sets input there is no requirement for a union operation performed at the type subset level.

Schema to Set Representation Translation Clauses

By way of additional examples, specific methods, systems, and computer-readable storage media of the present disclosure are described the following schema translation clauses.

Schema translation clause 1. A computer implemented method for processing an input schema to generate a set representation thereof, the method comprising:
  processing the input schema to initially determine whether the input schema accepts all values, no values, or some values, and:
  in response to initially determining that the input schema accepts all values, generating a complete set indicating that the input schema accepts all values of all types and returning the complete set as the set representation; and
  in response to initially determining that the input schema accepts no values, generating a complete set indicating that the input schema accepts no values of any type and returning the complete set as the set representation.

Schema translation clause 2. The computer implemented method of schema translation clause 1, wherein the input schema is determined to accept all values if the input schema is undefined or defines only a true Boolean value.

Schema translation clause 3. The computer implemented method of schema translation clause 1 or schema translation clause 2, wherein the input schema is determined to accept no values if the input schema defines only a false Boolean value.

Schema translation clause 4. The computer implemented method of any one of schema translation clauses 1 to 3, wherein in response to initially determining that the input schema accepts some values, processing the input schema further comprises:
  generating a plurality of type sets, each type set being in respect of a different type;
  populating each type set with type set data indicating any constraints imposed by the input schema on the particular type the type set is in respect of;
  generating an interim complete set; and
  adding each type set generated to the interim complete set.

Schema translation clause 5. The computer implemented method of schema translation clause 4, wherein for a given type set in respect of a particular type, populating the given type set with data indicating any constraints comprises:
  processing the input schema to determine whether it supports the particular type; and
  in response to determining that the input schema does not support the particular type, populating the given type set with type set data indicating that the input schema accepts no values of the particular type.

Schema translation clause 6. The computer implemented method of schema translation clause 4 or 5, wherein for a given type set in respect of a particular type, populating the given type set with data indicating any constraints comprises:
  processing the input schema to determine whether it supports the particular type; and
  in response to determining that the input schema supports the particular type, determining whether the input schema imposes any constraints on values of the particular type; and
  in response to determining that the input schema does not impose any constraints on values of the particular type, populating the given type set with type set data indicating that the input schema accepts all values of the particular type.

Schema translation clause 7. The computer implemented method of any one of schema translation clauses 4 to 6, wherein for a given type set in respect of a particular type, populating the given type set with data indicating any constraints comprises:
  processing the input schema to determine whether it supports the particular type;
  in response to determining that the input schema supports the particular type, determining whether the input schema imposes any constraints on values of the particular type; and
  in response to determining that the input schema does impose constraints on values of the particular type:
    processing the input schema to generate a set representation of the imposed constraints; and
    adding the set representation of the imposed constraints to the given type set.

Schema translation clause 8. The computer implemented method of any one of schema translation clauses 4 to 6, wherein for a given type set in respect of a particular type, populating the given type set with data indicating any constraints comprises:
  processing the input schema to determine whether it supports the particular type;

in response to determining that the input schema supports the particular type, determining whether the input schema imposes any constraints on values of the particular type; and in response to determining that the input schema does impose constraints on values of the particular type:
analysing the constraints to determine if any constraint contradictions exist;
in response to determining that one or more constraint contradictions exist, populating the given type set with type set data indicating that the input schema accepts no values of the particular type; and
in response to determining that no constraint contradictions exist:
processing the input schema to generate a set representation of the imposed constraints; and
adding the set representation of the imposed constraints to the given type set.

Schema translation clause 9. The computer implemented method of schema translation clause 8, wherein determining that a constraint contradiction exists comprises:
analysing the constraints imposed on the particular type by the input schema against a contradiction rule set, the contradiction rule set defining one or more contradiction rules; and
determining that two or more constraints imposed on the particular type by the input schema match a contradiction rule.

Schema translation clause 10. The computer implemented method of schema translation clause 8 or 9, wherein in response to determining that one or more constraint contradictions exist, the method further comprises causing a notification in respect of the one or more constraint contradictions to be generated.

Schema translation clause 11. The computer implemented method of any one of schema translation clauses 4 to 10, wherein processing the input schema further comprises:
determining if the input schema defines one or more Boolean logic keywords; and
in response to determining that the input schema defines one or more Boolean logic keywords:
processing each Boolean logic keyword to generate a corresponding Boolean logic set; and
updating the interim complete set using each generated Boolean logic set.

Schema translation clause 12. The computer implemented method of schema translation clause 11, wherein:
if the input schema defines an allOf Boolean logic keyword, the method comprises generating an allOf Boolean logic keyword set;
if the input schema defines an anyOf Boolean logic keyword, the method comprises generating an anyOf Boolean logic keyword set; and
if the input schema defines a oneOf Boolean logic keyword, the method comprises generating an oneOf Boolean logic keyword set.

Schema translation clause 13. The computer implemented method of schema translation clause 12, wherein generating an allOf Boolean logic keyword set comprises:
a) generating a set representation in respect of each schema defined by the allOf keyword in the input schema; and
b) calculating the intersection of the set representations generated in (a).

Schema translation clause 14. The computer implemented method of schema translation clause 12 or 13, wherein generating an anyOf Boolean logic keyword set comprises:

c) generating a set representation in respect of each schema defined by the anyOf keyword in the input schema; and
d) calculating the union of the set representations generated in (c).

Schema translation clause 15. The computer implemented method of any one of schema translation clauses 12 to 14, wherein generating a oneOf Boolean logic keyword set comprises:
e) generating a set representation in respect of each schema defined by the oneOf keyword in the input schema;
f) expanding the set representations generated in (e) into a oneOf equation comprising union, intersection, and complement set operations; and
g) computing the oneOf equation.

Schema translation clause 16. The computer implemented method of any one of schema translation clauses 11 to 15, wherein updating the interim complete set using each generated Boolean logic keyword sets comprises calculating the intersection of the interim complete set with each generated Boolean logic set.

Schema translation clause 17. The computer implemented method of any one of schema translation clauses 4 to 16, wherein processing the input schema further comprises:
determining if the input schema defines an operative conditional logic keyword;
in response to determining that the input schema defines an operative conditional logic keyword:
generating one or more conditional logic keyword sets; and
updating the interim complete set using the or each generated conditional logic keyword sets.

Schema translation clause 18. The computer implemented method of schema translation clause 17, wherein:
generating one or more conditional logic keyword sets comprises generating an if set representation, a then set representation, and an else set representation; and
updating the interim complete set using the generated conditional logic keyword sets comprises calculating the following equation:
$\{$updated input schema set$\}=\{$input schema set$\}\cap((\{$if set representation$\}\cap\{$then set representation$\})\cup(\neg\{$if set representation$\}\cap\{$else set representation$\}))$.

Schema translation clause 19. The computer implemented method of any one of schema translation clauses 4 to 18, wherein generating a plurality of type sets comprises generating one or more type sets selected from a group comprising: a number type set; a string type set; an object type set; and an array type set.

Schema translation clause 20. A system comprising:
one or more processors;
one or more non-transitory computer-readable storage media storing sequences of instructions which, when executed by the one or more processors, cause the one or more processors to perform a method according to any one of schema translation clauses 1 to 19.

Schema translation clause 21. Non-transitory computer-readable storage media storing sequences of instructions which, when executed by one or more processors, cause the one or more processors to perform a method according to any one of schema translation clauses 1 to 19.

Generating Coverage Notifications

This section describes a computer implemented method for identifying potential coverage anomalies in a schema.

Figure 6:
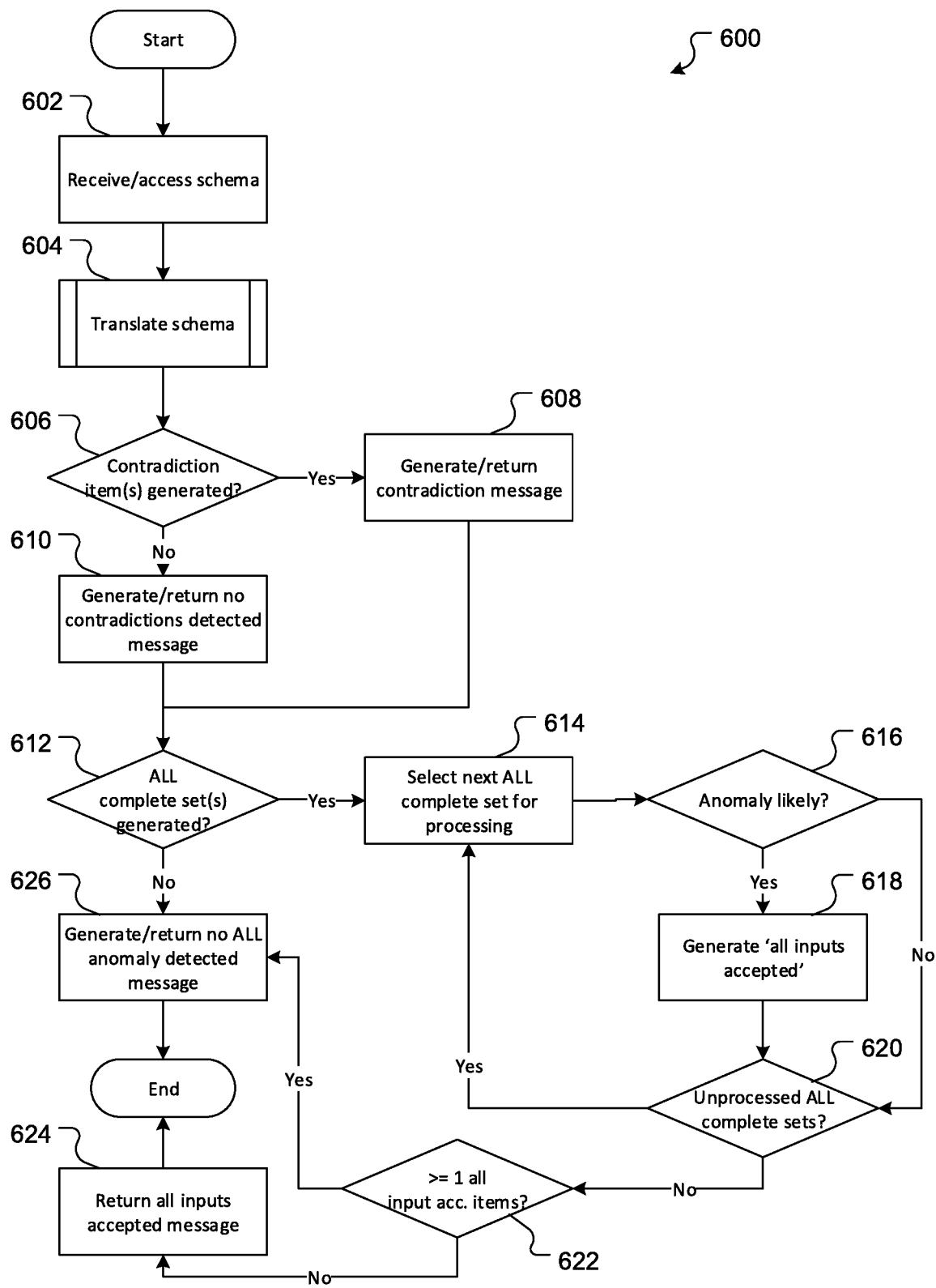
FIG. 6 is a flowchart illustrating processing performed by a computer processing system to generate schema coverage notifications.

The schema coverage notification process 600 will be described with reference to the flowchart of FIG. 6, which illustrates various processing blocks that are performed by a computer processing system. The coverage notification process is described as being performed by the coverage notification module 1218 described below (CNM 1220 for short), however could be performed by an alternative module, application or system.

At 602, the CNM 1220 receives or accesses an input schema (e.g. an input JSON schema). The input schema may be directly selected/provided by a user (e.g. via an application running on a user device), or may be selected/provide by another application (for example if execution of the coverage notification process is automated as part of a broader schema validation process).

At 604, the CNM 1220 translates the input schema, for example by initiating schema translation process 200 described above on the schema received/accessed at 602.

At 606, the CNM 1220 determines whether any contradiction items were generated during translating the schema (e.g. at 320). If so, processing continues to 608 (and if not to 610).

At 608, the CNM 1220 generates a contradiction message and returns this. The contradiction message includes data in respect of all contradiction items generated during the translation process. For example, for each contradiction item the contradiction message can indicate the nature of the contradiction identified along with a schema location indication indicating where in the input schema the contradiction arises.

Where the notification process is initiated by a user, e.g. via a client application 1232 running on a user device 1230 as discussed below, the contradiction message is returned to the client application. The application uses data in the contradiction message to generate a contradiction notification interface which is displayed to the user. Various contradiction interfaces may be generated. For example, the contradiction interface may display the input schema in its original form together with visual indications informing the user of identified contradictions. Various visual indications may be used, for example highlighting the relevant line(s)/portions of the schema giving rise to the contradiction in a particular colour (e.g. red) and displaying an associated note informing the user of on the nature of the contradiction the highlighted line(s)/portion creates (e.g. in a dialogue box, comment text added to the schema, or other manner).

Following generation and return of the contradiction message processing continues to 614.

At 610, no contradiction items were generated in the translation process. In this case the CNM 1220 generates and returns a message indicating that no EMPTY sets were identified—e.g. a message used to inform the user or process calling the notification process 600 that no contradictions were identified in the input schema. Processing then continues to 612.

In certain embodiments, the notification process ends at 612—i.e. the sole purpose of the notification process is to identify contradictions/empty sets. This is on the basis that an input schema that does not accept any values will typically be anomalous, and notifying the user of this will therefore be useful (i.e. so if it is in fact unintended the user can make corrections to the schema).

In alternative embodiments, the notification process may also (or alternatively) generate notifications in respect of an input schema that accept all values.

At 612, the CNM 1220 determines whether any ALL complete sets were generated in the translation of the input schema. If one or more ALL complete sets were generated processing continues to 614, if not processing continues to 626.

In certain implementations, the CNM 1220 may be configured to generate a message indicating a schema (or subschema thereof) accepts all inputs if any ALL complete sets are generated in the translation process. In a similar fashion to contradiction messages, an all inputs accepted message includes data indicating each schema that has been translated into an ALL complete set (and, therefore, accepts any values). A user can then determine whether the schema in question was intended to accept all values (in which case no change is required) or not (in which case the user may need to correct the schema).

As a general proposition, however, a schema that accepts all values is less likely to be anomalous than a schema that accepts no values. Accordingly, in the present example the CNM 1220 performs further processing to determine if a schema accepting all values appears to be a schema that is intended to accept all values or not.

At 614 the CNM 1220 selects the first ALL complete set generated in the translation process and obtains the original schema data corresponding to that ALL complete set.

At 616, the CNM 1220 determines whether an anomaly is likely in respect of the ALL complete set selected at 614. In the present embodiment the notification module does so by checking the original schema corresponding to the ALL complete set. If the original schema includes text/data indicating at least one constraint was likely intended (e.g. by use of one or more validation keywords, or the input schema including any data other than the Boolean value true), the CNM 1220 determines that an anomaly is likely and proceeds to 618. Conversely if the original schema does not include any text/data indicating at least one constraint was likely intended the CNM 1220 determines that an anomaly is not likely and proceeds to 620.

By way of example, consider the following schema:

```
{ anyOf: [
    { minimum: 0},
    { maximum: 0}
    ]
}
```

Example Schema

This is equivalent to the schema 'true', and as such the translation process can identify it as an ALL complete set. Given the fact that a user has gone to the trouble of creating this schema, however, rather than simply creating a schema 'true' there is a reasonable likelihood that the user indented something different and the CNM 1220 determines that an anomaly is likely.

By way of further example, consider the following schema:

```
{anyOf: [
    { minimum: 0, type: 'number'},
    { maximum: 0, type: 'number'}
    ]
}
```

Example Schema

This is equivalent to the schema "type: 'number'", and as such the translation process can identify it as an ALL number type set. Once again, given a user has gone to the trouble of creating this schema, the generation of an ALL number type set leads the CNM 1220 to determine that an anomaly is likely.

At 618, the notification module has determined that an anomaly is likely. In this case the notification module generates an all valid input item indicating the location of the particular schema corresponding to the ALL complete set currently being processed.

At 620, the CNM 1220 determines whether translation of the input schema generated any ALL complete sets that have not yet been processed. If so, processing returns to 614 to select the next ALL complete set for processing. If all generated ALL complete sets have been processed, processing continues to 620.

At 622, the CNM 1220 determines if any all inputs accepted items have been generated (at 618). If so, processing continues to 624 where the CNM 1220 generates and returns an all input valid message. The all input valid message is similar in some respect to the contradiction message generated at 608. The all input valid message includes data in respect of the all input valid items generated at 618, and in particular schema location indications for each JSON schema in the input that has been identified as a potentially anomalous all input valid item.

Where the notification process is initiated by a user, the all input valid message is returned to the application running on the user device. The application uses data in the message to generate an anomaly interface which is displayed to the user. The anomaly interface may, for example display the input schema in its original form together with visual indications informing the user of the schemas that have been identified as accepting all valid inputs.

If, at 622, the CNM 1220 determines that no all input valid items have been generated processing proceeds to 626. Processing also proceed to 626 if, at 612, the CNM 1220 determines that no ALL complete sets were generated in translation of the schema. At 626, the CNM 1220 generates and returns a message indicating that no ALL anomaly was detected in the input schema.

In example process 600 above, the CNM 1220 generates separate contradiction and all input valid messages (which, in some cases, causes display of separate contradiction and anomaly interfaces). In alternative embodiments, and where the CNM 1220 is reporting on both EMPTY complete sets and potentially anomalous ALL complete sets, the notification module may be configured to generate a single anomaly communication including both contradiction and all inputs accepted items, and cause display of a single anomaly interface which displays the original schema along with indications of schemas therein that accept no values and schemas therein that accept all values (and have been determined to be potentially anomalous).

In alternative implementations, the notification module may be configured to identify all schemas in the input that accept all inputs in the all valid input message generated at 624. In this case, the notification module may distinguish those that it has identified as potentially anomalous versus those that do not appear anomalous (per 616). This can then, for example, lead to those both types of all input valid schemas being visually indicated to a user but also distinguished (e.g. schemas that have been identified as potentially anomalous being highlighted in one colour and schemas that do not appear anomalous highlighted in another colour).

Coverage Notification Clauses

By way of additional examples, specific methods, systems, and computer-readable storage media of the present disclosure are described the following coverage notification (CN) clauses.

CN clause 1. A computer implemented method for generating a schema coverage notification, the method comprising:
  accessing an input schema;
  for each of a plurality of data types, processing the input schema to:
    determine that the input schema imposes two or more constraints on values of the data type;
    analysing the two or more constraints to determine if any constraint contradictions exist; and
    in response to determining that a constraint contradiction exists, generating a contradiction message including data with respect to the constraint contradiction identified.

CN clause 2. The computer implemented method of CN clause 1, wherein determining that a constraint contradiction exists comprises:
  analysing the constraints imposed on the given type by the input schema against a contradiction rule set, the contradiction rule set defining one or more contradiction rules; and
  determining that two constraints imposed on the data type by the input schema match a contradiction rule.

CN clause 3. The computer implemented method of CN clause 1, wherein determining that a constraint contradiction exists comprises:
  analysing the constraints imposed on the given type by the input schema against a contradiction rule set, the contradiction rule set defining one or more contradiction rules; and
  determining that three or more constraints imposed on the data type by the input schema match a contradiction rule.

CN clause 4. The computer implemented method of any one of CN clauses 1 to 3, wherein prior to processing the input schema to for each data type the method comprises:
  processing the input schema to initially determine whether the input schema is intended to accept some values, all values, or no values; and wherein
  processing the input schema to for each supported data type is only performed in response to determining that the input schema is intended to accept some values.

CN clause 5. The computer implemented method of CN clause 4, wherein the input schema is initially determined to be a schema intended to accept some values if the input schema is not a Boolean value.

CN clause 6. The computer implemented method of any one of CN clauses 1 to 5, wherein prior to determining that the input schema imposes two or more constraints on values of a particular data type the method further comprises:
  determining whether the input schema supports the particular data type; and wherein
  determining that the input schema imposes two or more constraints on values of the particular data type is only performed in response to determining that the input schema supports the particular data type.

CN clause 7. The computer implemented method of any one of CN clauses 1 to 6, wherein the contradiction message causes a contradiction interface to be displayed on a display, the contradiction interface displaying information on the constraint contradiction identified.

CN clause 8. The computer implemented method of CN clause 7, wherein the information displayed by the contradiction interface includes the nature of the contradiction identified in the input schema together with location information indicating where in the input schema the contradiction was identified.

CN clause 9. The computer implemented method of any one of CN clauses 1 to 8, wherein the data types are selected from a group comprising: a number type; a string type; an object type; and an array type.

CN clause 10. A system comprising:
one or more processors;
one or more non-transitory computer-readable storage media storing sequences of instructions which, when executed by the one or more processors, cause the one or more processors to perform a method according to any one of CN clauses 1 to 9.

CN clause 11. Non-transitory computer-readable storage media storing sequences of instructions which, when executed by one or more processors, cause the one or more processors to perform a method according to any one of CN clauses 1 to 9.

Comparing Schemas

This section describes a computer implemented method for comparing a set representation of a source schema ({SOURCE}) to a set representation of a destination schema ({DESTINATION}) to identify support changes. {SOURCE} and {DESTINATION} are complete sets obtained by translating source and destination input schemas respectively, for example using set translation process 200 as described above.

In use, it will often be the case that the source schema is a version of a particular schema and the destination schema is a subsequent version of that same schema.

Identifying support changes (and notifying developers of such changes as discussed below) provides developers or other programs with an additional check so they can confirm any support changes were intended and not introduced unintentionally. If changes were unintentional, the developer/program can then see what the changes are and make appropriate corrections instead of simply deploying the schema with unintended (and potentially disastrous) results. If the changes are intentional, it allows for confirmation that the intended consequences from a support perspective have been achieved and serves as a reminder that anyone making use of the schema should be notified of the changes. Depending on the particular changes in question, the notification may be that previous values will no longer be accepted, that previously optional values are now required, that there are new values that can be used, and/or that there are new values that must be used.

The present disclosure provides mechanisms for identifying two types of support changes, each of which will be discussed in turn: removed support changes and added support changes.

Removed Support Changes

As used herein, removed support changes refer to changes that occur where values that were accepted by the source schema are not accepted by the destination schema. Removed support changes can be breaking or non-breaking.

For example where the destination schema defines a format for data that is to be received, removed support changes are considered to be breaking changes (in the sense that they result in something that was accepted by the source schema to not be accepted by the destination schema).

In contrast, where the destination schema defines a format for data that is to be sent, removed support changes are not considered breaking. In this case the changes do not provide for new variables that are not going to be expected by the receiving side. The exception to this is if a removed support change is in respect of a variable that was required (rather than optional) by the receiving side, in which case the change is breaking.

Identification of breaking changes can be critical. For example, if the schema in question is an API then implementing a destination schema with removed support changes creates the potential that communications received in accordance with the source version of the schema will no longer work.

While identification of non-breaking changes may not be as critical, alerting a user to such changes can still be useful.

In order to calculate removed support changes, the set operation module 1218 is configured to perform the set operations in the following removed support changes equation:

$$\{\text{Removed support changes}\} = \{\text{SOURCE}\} \cap \neg (\{\text{SOURCE}\} \cap \{\text{DESTINATION}\})$$

The complete set resulting from this equation includes elements defining all removed support changes.

Added Support Changes

As used herein, added support changes refer to changes that occur where the destination schema accepts values that were not accepted by the source schema. Added support changes can be breaking or non-breaking.

For example where the destination schema defines a format for data that is to be received, added support changes are not considered to be breaking changes (in the sense that they do not result in something that was accepted by the source schema to be not accepted by the destination schema). The exception to this is if an added support change is in respect of required (rather than optional) variable, in which case the change is breaking.

In contrast, where the destination schema defines a format for data that is to be sent, added support changes are considered breaking, in that they allow for new variables that are not going to be expected by the receiving side (unless the receiving side is alerted).

In order to calculate added support changes, the set operation module 1218 is configured to perform the set operations in the following added support changes equation:

$$\{\text{Added support changes}\} = \{\text{DESTINATION}\} \cap \neg (\{\text{SOURCE}\} \cap \{\text{DESTINATION}\})$$

The complete set resulting from this equation includes elements defining all added support changes.

Generating Support Change Notifications

Figure 7:
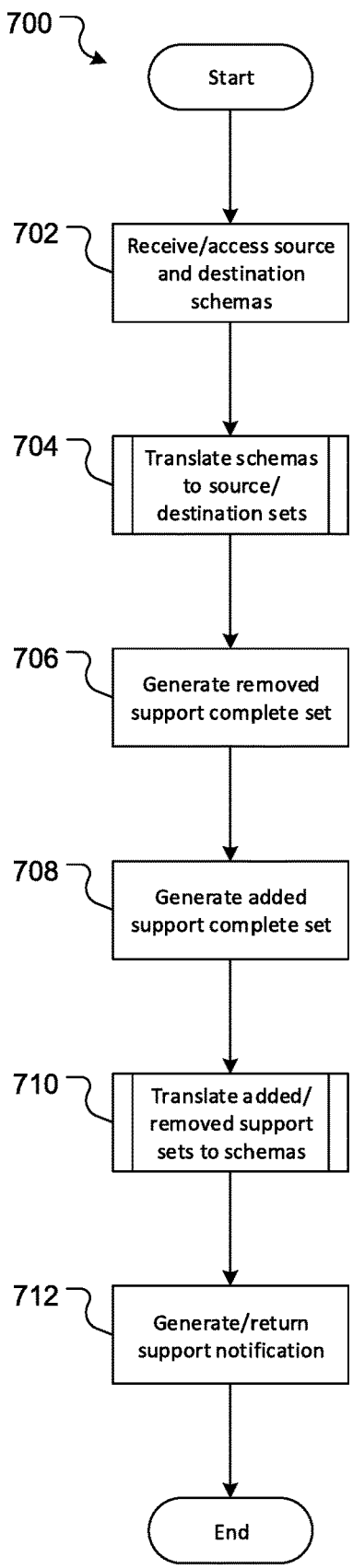
FIG. 7 is a flowchart illustrating processing performed by a computer processing system to generate schema support notifications.
Figure 8:
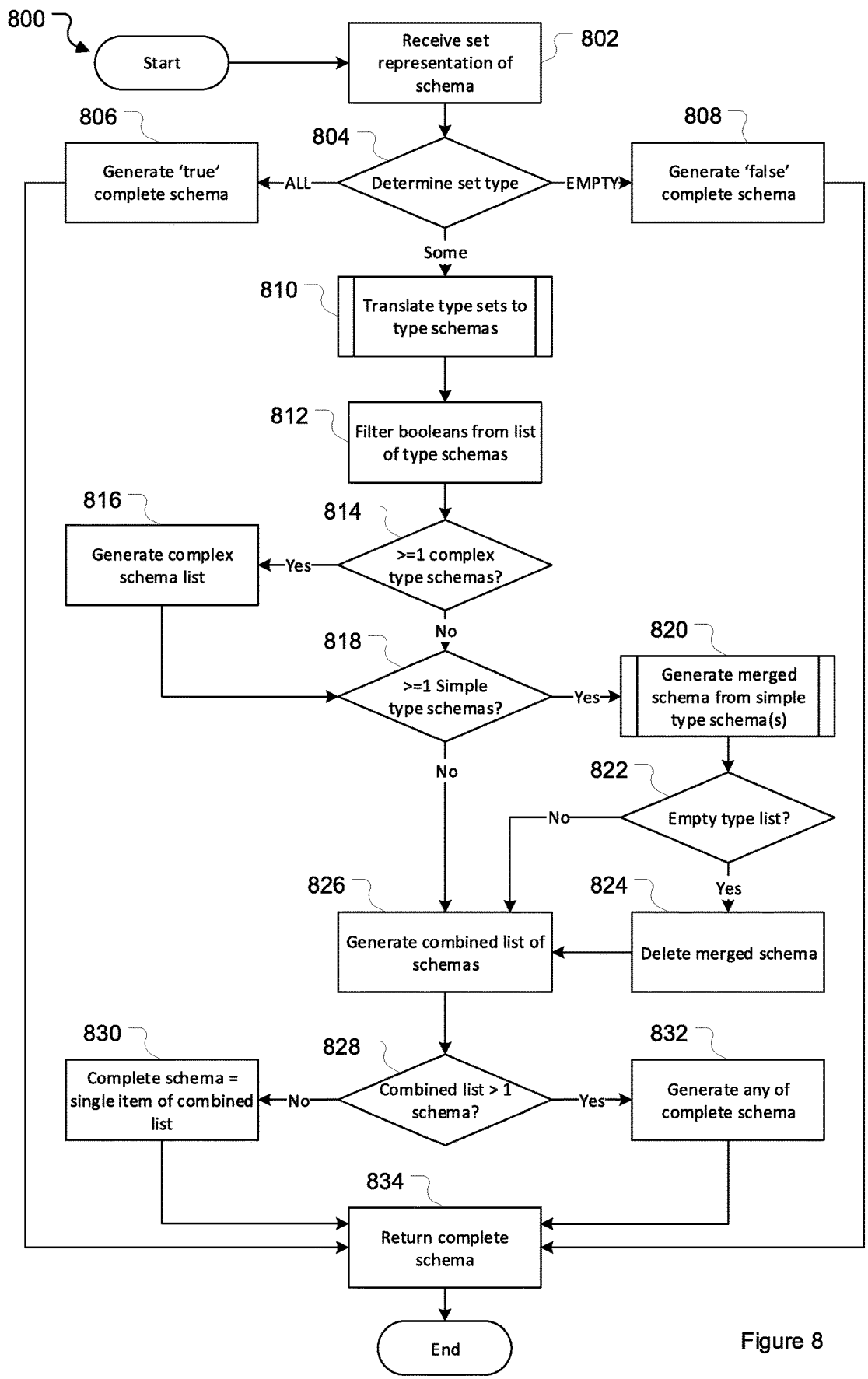
FIG. 8 is a flowchart illustrating processing performed by a computer processing system to translate an overall set representation into an end schema.
Figure 9:
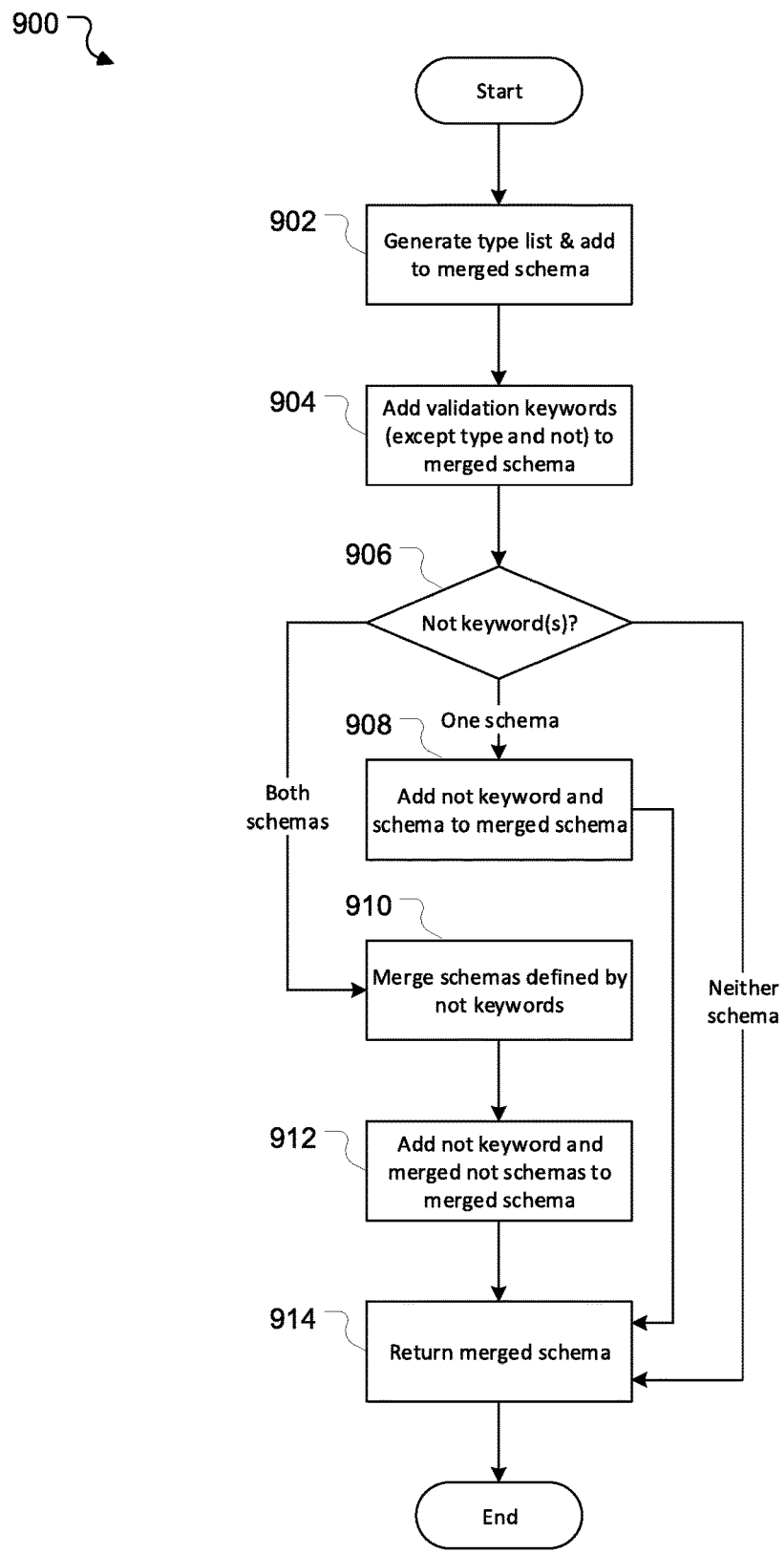
FIG. 9 is a flowchart illustrating processing performed by a computer processing system to merge schemas.

This section describes an example process for generating support change notifications 700 with reference to FIG. 7. Process 700 is described as being controlled by the support notification module 1222 running on computer processing system 1210 as described below (SNM 1222 for short), however could be performed/controlled by an alternative module, application or system.

At 702, the SNM 1222 receives or accesses a schema designated as a source schema and a schema designated as a destination schema. The schemas may be directly selected by a user interacting with a client application (e.g. client application 1232), or may be selected by a program (for example if execution of the coverage notification process is automated as part of a broader schema validation process).

At 704, the SNM 1222 translates the source and destination schemas received/accessed at 702, e.g. by calling schema to set translation processes 200 on each. The translation processes return two complete sets: a {SOURCE} complete set corresponding to the source schema and a {DESTINATION} complete set corresponding to the destination schema.

At 706, the SNM 1222 generates a removed support complete set (i.e. a complete set indicating removed support items). This can be done, for example, by processing the {SOURCE} and {DESTINATION} complete sets according to the removed support changes equation described above.

The SNM 1222 then continues to 708 to generate an added support complete set (i.e. a complete set indicating added support items). This can be done, for example, by processing the {SOURCE} and {DESTINATION} complete sets according to the added support changes equation described above.

Generation of the removed and added support complete sets could be performed in the opposite order or in parallel.

In the present embodiment, at 710 the SNM 1222 translates the added and removed support complete sets into added and removed support schemas respectively. This is done by initiating a set representation to schema translation process 800 on each complete set as described below with reference to FIG. 8. Translating the added and removed support complete sets back to schemas means the end user (or program) does not need to interpret the set representations but can instead review the removed/added support changes in the original schema syntax.

At 712, the SNM 1222 generates and returns a support notification. Return of the support notification will depend on how the process was invoked. For example, if the support notification process was invoked via a client application such as 1232 the support notification will typically be returned to that application.

If both the added and removed support complete sets are empty, no support changes were made. In this case the SNM 1222 generates a support notification at 710 with data indicating that no support changes were made. If one or both of the added and removed support sets are not empty, support changes were made. In this case, and in the present embodiment, the SNM 1222 generates a support notification with data in respect of any removed support changes (determined with reference to the removed support set generated at 706) and/or of any added support changes (determined with reference to the added support set generated at 708).

The support notification generated and returned at 712 can take various forms and be used in various ways. For example, the support notification can be returned to a client application 1232 and cause/be used by the client application 1232 to generate and display a support notification interface. Where data in the support notification indicates no support changes have been made, the support notification interface can simply display a message indicating this—for example 'no support changes identified'. This in itself can be useful information. For example, changes are typically made to a schema in order to alter the values accepted by the schema (either introduce added support changes or removed support changes). If a textual change is made to a schema but that change does not introduce any semantic change, the intention of the user in making the textual changes may not have been reached.

Where data in the support notification indicates support changes have been made, the support notification interface indicates this.

For example, in the event of added support changes the support notification interface may display a message such as 'new schema accepts values not accepted by original schema'. The support interface can also display the added support schema as generated at 710. Additionally, or alternatively, the support interface can display the destination schema as originally provided with added support portions visually distinguished for ease of identification by a user.

Similarly, in the event of removed support changes the support notification interface may display a message such as 'new schema does not accept values that were accepted by original schema'. The support interface can also display the removed support schema as generated at 710. Additionally, or alternatively, the support interface can display the source schema as originally provided with removed support portions visually distinguished for ease of identification by a user.

In certain implementations, the SNM 1222 can be configured to use the added support schema generated at 710 to generate added support examples—i.e. examples of values that weren't previously accepted and now are. Similarly, the SNM 1222 can be configured to use the removed support schema generated at 710 to generate removed support examples—i.e. examples of values that were previously accepted and are no longer accepted. The added/removed support schemas can be used to generate added/removed support examples using a tool such as 'JSON Schema Faker'.

The added/removed support examples can then be returned with the support notification to be displayed in the support interface. This should make it easier for the user to understand the nature of any added and/or removed support changes.

In any of these cases (e.g. no support changes, added support changes, removed support changes) the result may be as intended by the user making the changes. In this case the support notification serves as a double check that the intended changes to a schema have been properly made.

Support Notification Clauses

By way of additional examples, specific methods, systems, and computer-readable storage media of the present disclosure are described the following support notification (SN) clauses.

SN clause 1. A computer implemented method for generating a schema support notification, the method comprising:
  accessing a source schema;
  accessing a destination schema;
  processing the source schema to generate a source schema set representation;
  processing the destination schema to generate a destination schema set representation;
  performing set operations on the source schema set representation and destination schema set representation to identify any support changes between the destination schema and the source schema;
  generating a support notification in respect of any support changes identified.

SN clause 2. The computer implemented method of SN clause 1, wherein:
  the support changes identified include one or more added support changes; and
  the support notification indicates that one or more values that were not accepted under the source schema are accepted under the destination schema.

SN clause 3. The computer implemented method of SN clause 2, wherein the set operations performed to identify added support changes are:
  {destination schema set representation}∩¬({source schema set representation}∩{ destination schema set representation}).

SN clause 4. The computer implemented method of SN clause 2 or 3, wherein performing set operations to identify added support changes generates an added support set, and wherein the method further comprises:
    processing the added support set to generate an added support schema; and
    including the added support schema in the support notification.

SN clause 5. The computer implemented method of SN clause 4, further comprising:
    generating an added support example using the added support schema; and
    including the added support example in the support notification.

SN clause 6. The computer implemented method of SN clause 4 or 5, wherein if the added support set is an empty set the support notification indicates that no added support changes were identified.

SN clause 7. The computer implemented method of any one of SN clauses 4 to 6, wherein:
    processing the added support set to generate an added support schema is in accordance with any one of set translation clauses 1 to 10 described below.

SN clause 8. The computer implemented method of any one of SN clauses 1 to 7, wherein:
    the support changes identified include one or more removed support changes; and
    the support notification indicates that one or more values that were accepted under the source schema are not accepted under the destination schema.

SN clause 9. The computer implemented method of SN clause 8, wherein the set operations performed to identify removed support changes are:
    {source schema set representation}∩¬({source schema set representation}∩{destination schema set representation}).

SN clause 10. The computer implemented method of SN clause 8 or 9, wherein performing set operations to identify removed support changes generates a removed support set, and wherein the method further comprises:
    processing the removed support set to generate a removed support schema; and
    including the removed support schema in the support notification.

SN clause 11. The computer implemented method of SN clause 10, further comprising:
    generating a removed support example using the removed support schema; and
    including the removed support example in the support notification.

SN clause 12. The computer implemented method of SN clause 10 or 11, wherein if the removed support set is an empty set the support notification indicates that no removed support changes were identified.

SN clause 13. The computer implemented method of any one of SN clauses 10 to 12, wherein:
    processing the removed support set to generate an removed support schema is in accordance with any one of set translation clauses 1 to 10 described below.

SN clause 14. The computer implemented method of any one of SN clauses 1 to 13, wherein:
    processing the source schema to generate a source schema set is in accordance with any one of schema translation clauses 1 to 19 described above; and
    processing the destination schema to generate a destination schema set is in accordance with any one of schema translation clauses 1 to 19 described above.

SN clause 15. A system comprising:
    one or more processors;
    one or more non-transitory computer-readable storage media storing sequences of instructions which, when executed by the one or more processors, cause the one or more processors to perform a method according to any one of SN clauses 1 to 14.

SN clause 16. Non-transitory computer-readable storage media storing sequences of instructions which, when executed by one or more processors, cause the one or more processors to perform a method according to any one of SN clauses 1 to 14.

Translating a Set Representation of a Schema to a Schema

This section describes the translation of a set representation of a schema back to an actual schema: for example translating a complete set as described above to a JSON schema.

The set to schema translation process 800 will be described with reference to FIGS. 8, 9, 10, and 11. In certain embodiments, these processing steps are also performed by TM 1216 as described below.

In the schema to set representation process 200 described above, translation of a schema into a set results in a complete set. Unless the complete set is an ALL or EMPTY set, the complete set is a set of type sets, each type set made up of type subsets. Mirroring this, the set to schema translation process 800 translates type subsets into type subschemas, type sets into type schemas, and complete sets into complete schemas.

At 802, the TM 1216 receives a complete set that is to be translated into a schema. The complete set will typically be received from another module or application—for example from the SNM 1222 (at 710 of support notification process).

At 804, the TM 1216 determines whether the complete set received is an ALL complete set (in which case processing proceeds to 806), an EMPTY complete set (in which case processing proceeds to 808), or a SOME complete set (in which case processing proceeds to 810).

An ALL complete set indicates that all values are accepted. Accordingly, at 806 the TM 1216 generates a complete schema taking a single Boolean value of True. For example:

| Example complete schema |
| --- |
| True |

Processing then proceeds to 834 where the TM 1216 returns the result schema and processing ends.

An EMPTY complete set indicates that no values are accepted. Accordingly, at 808 the TM 1216 generates a complete schema taking a single Boolean value of False. For example:

| Example complete schema |
| --- |
| False |

Processing then proceeds to 834 where the TM 1216 returns the result schema and processing ends.

If the complete set is a SOME complete set it will include a plurality of type sets, specifically one for each type supported by the original schema to set representation translation process. Accordingly, at 810 the TM 1216 processes each type set by calling a type set to schema translation process (described with reference to FIG. 10 below). Each type set to schema translation process returns a type schema. Accordingly, translation of the type set schemas at 810 generates a list of type schemas.

For example, if the schema to set translation process supports the types object, array, number, and string, the SOME complete set will include an object type set, an array type set, a number type set, and a string type set. In this case the TM 1216 initiates four type set to schema translation processes at 810: an object type set to object type schema translation process which returns an object type schema; an array type set to array type schema translation process which returns an array type schema; a number type set to number type schema translation process which returns a number type schema; and a string type set to string type schema translation process which returns a string type schema.

At 812, the TM 1216 filters any type schemas that are Booleans from the list of type schemas. In this regard, it is noted that per the type set to schema translation process described below, the only way to arrive at type schema that has a Boolean value is from an EMPTY type set: i.e. a type set that accepts no values and generates a false value. At 812, therefore, the TM 1216 removes type schemas with 'false' values (i.e. type schemas accepting no values) from the list of type schemas.

Following 812, the list of type schemas can include type schemas that have an 'anyOf' Boolean logic keyword (which will be referred to as complex type schemas) and type schemas that do not have an 'anyOf' Boolean logic keyword (which will be referred to as simple type schemas).

At 814, the TM 1216 determines if the list of type schemas includes one or more complex type schemas. If so processing proceeds to 816, if not to 818.

At 816, the TM 1216 processes all complex type schemas in the list of type schemas by combining all schemas defined by all anyOf keywords into a single list of schemas—this will be referred to as the complex schema list. For example, if there were two complex schemas being: "anyOf: [{Schema A}, {Schema B}]" and "anyOf: [{Schema C}]", the resulting complex schema list would be [{Schema A}, {Schema B}, {Schema C}]. Processing then continues to 818.

At 818, the TM 1216 determines if the list of type schemas includes one or more simple type schemas. If so processing proceeds to 820, if not to 826.

At 820, the TM 1216 generates a merged schema from all simple type schemas in the list of type schemas. If a single simple type schema exists, that simple type schema becomes the merged simple type schema. Where more than one simple type schema exists all are merged together in a merge process 900 as described further below.

At 822, the TM 1216 determines if the merged schema has an empty type list. If so processing proceeds to 824. If not processing proceeds to 826.

If the merged schema has an empty type list, the TM 1216 deletes the merged schema at 824 and processing proceeds to 826.

At 826, the TM 1216 generates a list of schemas by combining schemas in the complex schema list (if the complex schema list exists) with the merged schema (if the merged schema exists). If the complex schema list exists and no merged schema exists, the list of schemas generated at 826 is the complex schema list. If the complex schema list does not exist and the merged schema exists, the list of schemas generated at 826 is a list with a single item of the merged schema. If the complex schema list exists and the merged schema exists, the list of schemas generated at 826 is a list including the schemas in the complex schema list and the merged schema.

At 828, the TM 1216 determines if the combined schema list has a single element. If so, processing proceeds to 830. If not processing proceeds to 832.

At 830, the combined schema list has a single schema element. In this case, the complete schema is the single schema element of the combined schema list. For example, if the combined schema list is [{Schema A}], the complete schema result generated at 832 is:

| Example complete schema |
| --- |
| {Schema A} |

Processing then proceeds to 834 where the TM 1216 returns the result schema and processing ends.

At 832, the combined schema list has more than one schema element. In this case, the TM 1216 generates a complete schema with the anyOf Boolean logic keyword with an associated value being an array of the schemas of the combined schema list. For example, if the combined schema list is [{Schema A}, {Schema B}, {Schema C}], the complete schema generated at 832 is:

| Example complete schema |
| --- |
| {<br>  "anyOf": [<br>    {Schema A},<br>    {Schema B},<br>    {Schema C},<br>  ]<br>} |

Processing then proceeds to 834 where the TM 1216 returns the result schema and processing ends.

Merging Schemas

This section describes a merge process 900 for merging two schemas together. The merge process is called at 820 of the set representation to schema translation process 800 above.

Where more than two schemas need to be merged, this is done in sequential merge processes. For example, if schemas A, B, C, and D need to be merged this is done as (((A merge B) merge C) merge D): i.e. A is merged with B to create AB. AB is merged with C to create ABC. ABC is merged with D to create ABCD.

For descriptive purposes the two schemas being merged will be referred to as Schema A and Schema B (order being unimportant).

At 902, the TM 1216 generates a type list having the types defined by both the Schema A and Schema B type keywords. The TM 1216 adds the type list generated to a new schema which will be referred to the merged schema.

For example, if the Schema A type list is "type": ["array"] and the schema B type list is type": ["object"], the new type list generated and added to the merged schema at 902 is "type": ["array", "object"].

As a second example, if the Schema A type list is "type": ["array", "object"] (for example generated by merging two type schemas per the preceding paragraph) and the schema B type list is type": ["number"], the new type list generated and added to the merged schema at 902 is "type": ["array", "object", "number"].

At 904, the TM 1216 adds all validation keywords (and their values) from Schema A and Schema B except the type and not keywords to the merged schema. Where a merge process is called, the schemas being merged will have different types (as defined by the schema's respective type lists). With the exception of the 'type' and 'not' keywords, therefore, the validation keywords of Schema A will be different to the validation keywords of Schema B and there will be no duplicate validation keywords in the combined list.

At 906, the TM 1216 determines if neither, either, or both of the schemas being merged include the Boolean logic not keyword. If one schema includes the not keyword, processing continues to 908. If both schemas include the not keyword, processing continues to 910. If neither schema includes the not keyword, processing continues to 914.

At 908, one schema includes the not keyword (the value of the not keyword being a complete schema). In this case, the TM 1216 adds the 'not' keyword and complete schema to the merged schema. Processing then proceeds to 914.

At 910, both schemas include the not keyword. In this case, the TM 1216 calls a new merge process to merge the two complete schemas defined by the two not keywords. At 912, the TM 1216 then adds the 'not' keyword to the merged schema, the value of the 'not' keyword being the merged schema generated at 910. Processing then proceeds to 914.

At 914, the TM 1216 returns the merged schema.

Type Set to Schema Translation

Figure 10:
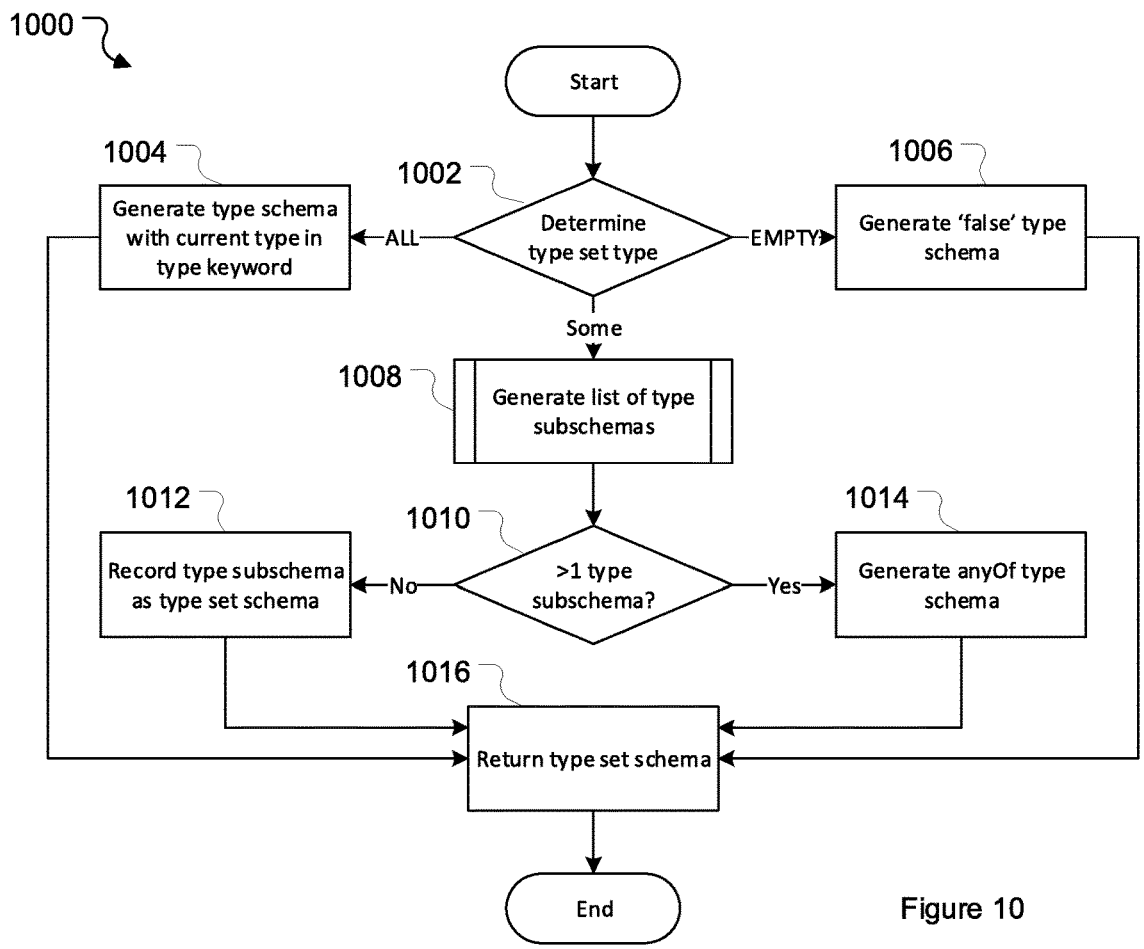
FIG. 10 is a flowchart illustrating processing performed by a computer processing system to translate a type set representation into a type set schema.
Figure 11:
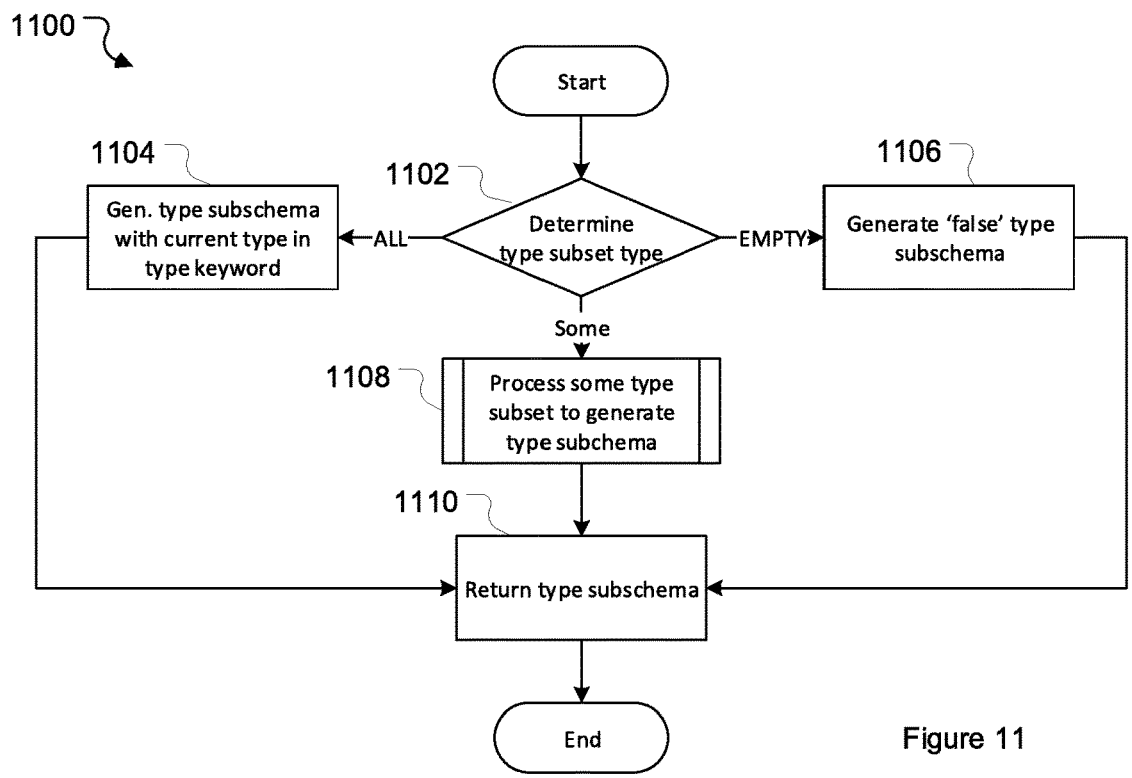
FIG. 11 is a flowchart illustrating processing performed by a computer processing system to translate a type subset representation into a type subschema.

Turning to FIG. 10, a type set to schema translation process 1000 (as invoked at 810 above) will be described. As noted, the type set to schema translation process 1000 is performed for each different type set in the complete set input/received at 800.

At 1002, the TM 1216 determines whether the type set received is an ALL type set (in which case processing proceeds to 1004), an EMPTY type set (in which case processing proceeds to 1006), or a SOME type set (in which case processing proceeds to 1008).

An ALL type set indicates that all values are accepted. Accordingly, at 1004 the TM 1216 generates a type schema with the type keyword taking the value of the current type being processed. For example, if the type set being processed is the object type set and the value of the type set is ALL, the following type schema is generated:

| Example type schema |
|---|
| {<br>   "type": ["object"]<br>} |

Processing then continues to 1016 to return the type schema.

An EMPTY type set indicates that no values are accepted. Accordingly, at 1006 the TM 1216 generates a result schema taking a single Boolean value of False. For example:

| Example type schema |
|---|
| False |

Processing then continues to 1016 to return the type schema.

If the type set is a SOME type set it will be a list of one or more type subsets. Accordingly, at 1008 the TM 1216 iterates over the list of type subsets. Each type subset is translated to a type subschema (as described below with reference to FIG. 11), and the TM 1216 adds each type subschema generated to a list of type subschemas.

At 1010, the TM 1216 determines whether the list of type subschemas generated at 1008 has a single type subschema (in which case processing proceeds to 1012) or more than one type subschema (in which case processing proceeds to 1014).

At 1012, a single type subschema has been generated. In this case the TM 1216 records the single type subschema as the type schema. Processing then continues to 1016 to return the type schema.

At 1014, multiple type subschemas have been generated. In this case the TM 1216 generates a type schema having the Boolean validation keyword "anyOf" and assigns the value of that keyword to be the list of type subschemas generated at 1008.

For example, if processing the type subschemas results in [{type subschema A}, {type subschema B}, {type subschema C}], the TM 1216 generates a type schema of:

| Example type schema |
|---|
| {<br>  "anyOf":<br>  [<br>    {type subschema A},<br>    {type subschema B},<br>    {type subschema C}<br>  ]<br>} |

Processing then continues to 1016 to return the type schema.

Type Subset to Type Subschema Translation

In order to translate a given type set to a schema, each type subset of that type set must be translated into a schema at 1008. Generally speaking this involves translating any value constraints indicated in a type subset into schema form—i.e. schema syntax versions of the value constraints. The schema generated when translating a type subset will be referred to as a type subschema. A type subset to type subschema translation process 1100 will be described with reference to FIG. 11.

At 1102, the TM 1216 determines whether the type subset in question is an ALL type subset (in which case processing proceeds to 1104), an EMPTY type subset (in which case processing proceeds to 1106), or a SOME type subset (in which case processing proceeds to 1108).

An ALL type subset indicates that all values are accepted. Accordingly, at 1104 the TM 1216 generates a type subschema with the type keyword taking the value of the current type being processed. For example, if the type subset being processed is the string type set and the value of the type set is ALL, the following type subschema is generated:

| Example type subschema |
|---|
| {<br>   "type": ["string"]<br>} |

Processing then continues to 1110 to return the type subschema.

An EMPTY type subset indicates that no values are accepted. Accordingly, at 1106 the TM 1216 generates a result schema taking a single Boolean value of False. For example:

| Example type subschema |
| --- |
| False |

Processing then continues to 1110 to return the type schema.

If the type subset is a SOME type subset, the TM 1216 processes it to generate a type subschema at 1108. The type subschema generated is then returned at 1110.

In order to process a given SOME type subset at 1108, the TM 1216 processes each validation keyword of that type subset. The processing performed, therefore, depends on the type of the type subset (e.g. number, string, object, etc.) and the validation keywords associated with that type. Processing for various type subsets is described below. Although processing of a given type subset is described in a particular order, the steps can typically be performed in any desired order.

Object Type Subset to Type Subschema Translation

Translation of an object type subset to an object type subschema will be described with reference to the following example object type subset:

| Example object type subset |
| --- |
| Object type subset |
| ObjectSubsetConfig { <br>     additionalProperties: {addProp complete set A}; <br>     maxProperties: maxA; <br>     minProperties: minA; <br>     not: [ <br>         {notObjectSubsetA1}, <br>         {notObjectSubsetA2}, <br>         ..., <br>         {notObjectSubsetAn} <br>     ]; <br>     properties: { <br>         "A1": {prop complete set A1}, <br>         "A2": (prop complete set A2}, <br>         ..., <br>         "An": {prop complete set An} <br>     }; <br>     required: ["req A1", "req A2", ..., "req An"] <br> } |

Initially, the TM 1216 generates an object type subschema with 'object' in the type list thereof—i.e.: {"type": ["object"]}.

Object Type Subset to Type Subschema Translation: additionalProperties Keyword

If the value of the additionalProperties keyword is the default value, the TM 1216 takes no action with respect to this keyword.

Otherwise, the TM 1216 translates the complete set value of additionalProperites to a schema (e.g. by calling process 800 on the complete set). The TM 1216 then writes the 'additionalProperties' keyword to the object type subschema with its value being the schema generated by the set to schema translation process. For example:

| Example object type subschema |
| --- |
| { <br>   "type": ["object"], <br>   "additionalProperties": {addProp complete set A translated to schema} <br> } |

Object Type Subset to Type Subschema Translation: maxProperties Keyword

If the value of the maxProperties keyword is the default value, the TM 1216 takes no action with respect to this keyword.

Otherwise, the TM 1216, writes the 'maxProperties' keyword to the object type subschema with its value being the maxProperties value of the type subset being translated. For example:

| Example object type subschema |
| --- |
| { <br>   "type": ["object"], <br>   ... <br>   "maxProperties": maxA <br> } |

Object Type Subset to Type Subschema Translation: minProperties Keyword

If the value of the minProperties keyword is the default value, the TM 1216 takes no action with respect to this keyword.

Otherwise, the TM 1216, writes the 'minProperties' keyword to the object type subschema with its value being the minProperties value of the type subset being translated. For example:

| Example object type subschema |
| --- |
| { <br>   "type": ["object"], <br>   ... <br>   "minProperties": minA <br> } |

Object Type Subset to Type Subschema Translation: Not Keyword

If the value of the not keyword is the default value, the TM 1216 takes no action with respect to this keyword.

Otherwise, the not keyword defines an array of object type subsets. The TM 1216 translates each object type subset into an object type subschema by calling a new type subset to type subschema translation process 1100 thereon. This results in a list of object type subschemas (with one or more elements).

If the list of object type subschemas has a single item, the TM 1216, writes the 'not' keyword to the object type subschema with its value being the single item in the list of object type subschemas. For example (and if 'notObjectSubsetA1' was the sole object type subset of the 'not' keyword in the example object type subset above):

| Example object type subschema |
| --- |
| {<br>   "type": ["object"],<br>   ...<br>   "not": {[single notObjectSubsetA1 translated to subschema}<br>} |

If the list of object type subschemas has more than one item, the TM 1216, writes the 'not' keyword to the object type subschema. The value of the 'not' keyword is the 'anyOf' keyword with its value being the items in the list of object type subschemas. For example:

| Example object type subschema |
| --- |
| {<br>   "type": ["object"],<br>   ...<br>   "not": {<br>      "anyOf": [<br>         {notObjectSubsetA1 translated to subschema},<br>         {notObjectSubsetA2 translated to subschema},<br>         ...<br>         {notObjectSubsetAn translated to subschema}<br>      ]<br>   }<br>} |

Object Type Subset to Type Subschema Translation: Properties Keyword

If the value of the properties keyword is the default value, the TM 1216 takes no action with respect to this keyword.

Otherwise, the properties keyword TM 1216 defines a map of names (strings) and corresponding complete sets. The TM 1216 translates each complete set (calling a new set to schema translation process for each). The TM 1216 then creates a properties map with names corresponding to the names in the properties keyword and their corresponding schemas being the translated schemas. For example:

| Example object type subschema |
| --- |
| {<br>   "type": ["object"],<br>   ...<br>   "properties": {<br>      "A1":{prop complete set A1 translated to schema},<br>      "A2":{prop complete set A2 translated to schema},<br>      ...,<br>      "An":{prop complete set An translated to schema}<br>   }<br>} |

Object Type Subset to Type Subschema Translation: Required Keyword

If the value of the required keyword is the default value, the TM 1216 takes no action with respect to this keyword.

Otherwise, the TM 1216 writes the 'required' keyword to the object type subschema with its value being the required value of the type subset being translated. For example:

| Example object type subschema |
| --- |
| {<br>   "type": ["object"],<br>   ...<br>   "required": ["req A1", "req A2", ..., "req An"]<br>} |

Array Type Subset to Type Subschema Translation

Translation of an array type subset to an array type subschema will be described with reference to the following example array type subset:

| Example array type subset<br>Array subset |
| --- |
| ArraySubsetA {<br>   items: {items complete set A};<br>   maxItems: maxA;<br>   minItems: minA;<br>   not: [<br>      {notArraySubsetA1}, {notArraySubsetA2}, ...,<br>      {notArraySubsetAn}<br>   ]<br>} |

Initially, the TM 1216 generates an array type subschema with 'array' in the type list thereof—i.e.: {"type": ["array"]}.

Array Type Subset to Type Subschema Translation: Items Keyword

If the value of the items keyword is the default value, the TM 1216 takes no action with respect to this keyword.

Otherwise, the TM 1216 translates the complete set value of items to a schema (e.g. by calling process 800 on the complete set) and writes the 'items' keyword to the array type subschema with its value being the schema generated by the set to schema translation process. For example:

| Example array type subschema |
| --- |
| {<br>   "type": ["array"],<br>   "items": {items complete set A translated to schema]<br>} |

Array Type Subset to Type Subschema Translation: maxItems Keyword

If the value of the maxItems keyword is the default value, the TM 1216 takes no action with respect to this keyword.

Otherwise, the TM 1216, writes the 'maxItems' keyword to the array type subschema with its value being the maxItems value of the type subset being translated. For example:

| Example array type subschema |
| --- |
| {<br>   "type": ["array"],<br>   ...<br>   "maxItems": maxA<br>} |

Array Type Subset to Type Subschema Translation: minItems Keyword

If the value of the minItems keyword is the default value, the TM 1216 takes no action with respect to this keyword.

Otherwise, the TM 1216, writes the 'minItems' keyword to the array type subschema with its value being the minItems value of the type subset being translated. For example:

| Example array type subschema |
| --- |
| {<br>    "type": ["array"],<br>    ...<br>    "minItems": minA<br>} |

Array Type Subset to Type Subschema Translation: Not Keyword

If the value of the not keyword is the default value, the TM 1216 takes no action with respect to this keyword.

Otherwise, the TM 1216 translates the not keyword in the same way the not keyword of the object type subset is translated. I.e. the TM 1216 translates each array type subset defined by the not keyword into an array type subschema to generate a list of array type subschemas. If the list has a single item, the TM 1216, writes the 'not' keyword to the array type subschema with its value being the single item in the list of array type subschemas. If the list of array type subschemas has more than one item, the TM 1216, writes the 'not' keyword to the array type subschema, the value of the 'not' keyword being the 'anyOf' keyword with its value in turn being the items in the list of array type subschemas.

Number Type Subset to Type Subschema Translation

Translation of a number type subset to a number type subschema will be described with reference to the following example number type subset:

| Example number type subset<br>Number subset |
| --- |
| NumberSubsetA {<br>    maximum: maxA;<br>    exclusiveMaximum: exMaxA;<br>    minimum: minA;<br>    exclusiveMinimum: exMinA;<br>} |

Initially, the TM 1216 generates a number type subschema with 'number' in the type list thereof—i.e.: {"type": ["number"]}.

Number Type Subset to Type Subschema Translation: Maximum Keyword

If the value of the maximum keyword is the default value, the TM 1216 takes no action with respect to this keyword.

Otherwise, the TM 1216 writes the 'maximum' keyword to the number type subschema with its value being the maximum value of the type subset being translated. For example:

| Example number type subschema |
| --- |
| {<br>    "type": ["number"],<br>    "maximum": maxA<br>} |

Number Type Subset to Type Subschema Translation: exclusiveMaximum Keyword

If the value of the exclusiveMaximum keyword is the default value, the TM 1216 takes no action with respect to this keyword.

Otherwise, the TM 1216 writes the 'exclusiveMaximum' keyword to the number type subschema with its value being the maximum value of the type subset being translated. For example:

| Example number type subschema |
| --- |
| {<br>    "type": ["number"],<br>    ...<br>    "exclusiveMaximum": exMaxA<br>} |

Number Type Subset to Type Subschema Translation: Minimum Keyword

If the value of the minimum keyword is the default value, the TM 1216 takes no action with respect to this keyword.

Otherwise, the TM 1216 writes the 'minimum' keyword to the number type subschema with its value being the minimum value of the type subset being translated. For example:

| Example number type subschema |
| --- |
| {<br>    "type": ["number"],<br>    ...<br>    " minimum ": minA<br>} |

Number Type Subset to Type Subschema Translation: exclusiveMinimum Keyword

If the value of the exclusiveMinimum keyword is the default value, the TM 1216 takes no action with respect to this keyword.

Otherwise, the TM 1216 writes the 'exclusiveMinimum' keyword to the number type subschema with its value being the exclusiveMinimum value of the type subset being translated. For example:

| Example number type subschema |
| --- |
| {<br>    "type": ["number"],<br>    ...<br>    "exclusiveMinimum": exMinA<br>} |

String Type Subset to Type Subschema Translation

Translation of a string type subset to a string type subschema will be described with reference to the following example string type subset:

| Example string type subset<br>String subset |
| --- |
| StringSubsetA {<br>    maxLength: maxA;<br>    minLength: minA;<br>} |

Initially, the TM 1216 generates a string type subschema with 'string' in the type list thereof—i.e.: {"type": ["string"]}.

String Type Subset to Type Subschema Translation: maxLength Keyword

If the value of the items keyword is the default value, the TM 1216 takes no action with respect to this keyword.

Otherwise, the TM 1216 writes the 'minimum' keyword to the string type subschema with its value being the maxLength value of the type subset being translated. For example:

| Example string type subschema |
|---|
| {<br>  "type": ["string"],<br>  ...<br>  "maxLength": maxA<br>} |

String Type Subset to Type Subschema Translation: minLength Keyword

If the value of the items keyword is the default value, the TM 1216 takes no action with respect to this keyword.

Otherwise, the TM 1216 writes the 'maxLength' keyword to the string type subschema with its value being the minLength value of the type subset being translated. For example:

| Example string type subschema |
|---|
| {<br>  "type": ["string"],<br>  ...<br>  "minLength": maxA<br>} |

Set to Schema Translation Clauses

By way of additional examples, specific methods, systems, and computer-readable storage media of the present disclosure are described the following set translation clauses.

Set translation clause 1. A computer implemented method for processing an input set to generate a schema, the method comprising:
　processing the input set to initially determine whether the set is an all set indicating all values are accepted, an empty set indicating no values are accepted, or a some set indicating some values are accepted and:
　　in response to initially determining that the set is an all set, generating a complete schema that accepts all values and returning the complete schema;
　　in response to initially determining that the set is an empty set, generating a complete schema that accepts no values and returning the complete schema; and
　　in response to initially determining that the set is a some set, generating a complete schema that accepts some values and returning the complete schema.

Set translation clause 2. The computer implemented method of set translation clause 1, wherein the input set is initially determined to be a some set if the input set includes a plurality of type sets, each type set being in respect of a particular data type.

Set translation clause 3. The computer implemented method of set translation clause 2, wherein the particular data types are selected from a group of data types comprising: a number data type; a string data type; an object data type; and an array data type.

Set translation clause 4. The computer implemented method of set translation clause 2 or 3, wherein the method further comprises:
　processing each of the plurality of type sets to generate a corresponding type schema; and
　generating the complete schema by combining the type schemas.

Set translation clause 5. The computer implemented method of set translation clause 4, wherein processing a given type set in respect of a particular data type to generate its corresponding type schema comprises:
　determining if the given type set is an all type set; and
　in response to determining that the given type set is an all type set, generating a corresponding type schema that accepts all values of the particular data type.

Set translation clause 6. The computer implemented method of set translation clause 4 or claim 5, wherein processing a given type set in respect of a particular data type to generate its corresponding type schema comprises:
　determining if the given type set is an empty type set; and
　in response to determining that the given type set is an empty type set, generating a corresponding type schema that accepts no values of the particular data type.

Set translation clause 7. The computer implemented method of any one of set translation clauses 4 to 6, wherein processing a given type set in respect of a particular data type to generate its corresponding type schema comprises:
　determining if the given type set is a some type set; and
　in response to determining that the given type set is a some type set:
　　processing the given type set to generate a type subschema, the type subschema generated by translating any keyword constraints defined by the given type set on the particular data type into corresponding schema syntax constraints; and
　　including the schema syntax constraints in the type subschema.

Set translation clause 8. The computer implemented method of set translation clause 7, further comprising:
　determining if processing the given type set to generate a type subschema generates one or more than one type subschemas;
　in response to determining that a single type subschema is generated, returning the single type subschema as a type schema; and
　in response to determining that more than one type subschemas are generated:
　　generating a type schema that indicates any one of the type subschemas is valid; and
　　returning the type schema.

Set translation clause 9. The computer implemented method of any one of set translation clauses 4 to 8, wherein combining the type schemas into the complete schema comprises:
　determining if any type schemas are simple type schemas, a simple type schema being a type schema that does not include an anyOf Boolean operator;
　in response to determining that one or more type schemas is a simple type schema, generating a single merged simple schema based on the simple type schemas; and
　generating a schema list including:
　　the merged simple type schema if generated; and
　　any complex type schemas, a complex type schema being a type schema that includes an anyOf Boolean operator.

Set translation clause 10. The computer implemented method of set translation clause 9, further comprising:
　determining if the schema list includes a single schema or more than one schema;
　in response to determining that the schema list includes single schema, recording the single schema as the complete schema; and in response to determining that the schema list includes more than one schema, generating a complete schema that indicates any one of the schemas in the schema list is valid.

Set translation clause 11. A system comprising:

one or more processors;

one or more non-transitory computer-readable storage media storing sequences of instructions which, when executed by the one or more processors, cause the one or more processors to perform a method according to any one of set translation clauses 1 to 10.

Set translation clause 12. Non-transitory computer-readable storage media storing sequences of instructions which, when executed by one or more processors, cause the one or more processors to perform a method according to any one of set translation clauses 1 to 10.

WORKED EXAMPLES

In order to further illustrate the processing described above, this section provides examples of JSON schemas translated into Worked Example 1

Worked example 1 has the following source schema:

| Worked example 1: source schema |
|---|
| {<br>    "type": "string"<br>} |

Translation of the source schema according to process 200 described above generates the following set representation:

| Worked example 1: source schema set representation |
|---|
| SomeCompleteSet {<br>    config:<br>        { array: EmptyTypeSet { setType: 'array', type: 'empty' },<br>            boolean: EmptyTypeSet { setType: 'boolean', type: 'empty' },<br>            integer: EmptyTypeSet { setType: 'integer', type: 'empty' },<br>            null: EmptyTypeSet { setType: 'null', type: 'empty' },<br>            number: EmptyTypeSet { setType: 'number', type: 'empty' },<br>            object: EmptyTypeSet { setType: 'object', type: 'empty' },<br>            string: AllType Set { setType: 'string', type: 'all' } },<br>    type: 'some',<br>    setType: 'complete' } |

Worked example 1 has the following destination schema:

| Worked example 1: destination schema |
|---|
| {<br>    "type": "number"<br>} |

Translation of the destination schema according to process 200 described above generates the following set representation:

| Worked example 1: destination schema set representation |
|---|
| {<br>SomeCompleteSet {<br>    config:<br>        { array: EmptyTypeSet { setType: 'array', type: 'empty' },<br>            boolean: EmptyTypeSet { setType: 'boolean', type: 'empty' },<br>            integer: EmptyTypeSet { setType: 'integer', type: 'empty' },<br>            null: EmptyTypeSet { setType: 'null', type: 'empty' },<br>            number: AllTypeSet { setType: 'number', type: 'all' },<br>            object: EmptyTypeSet { setType: 'object', type: 'empty' },<br>            string: EmptyTypeSet { setType: 'string', type: 'empty' } },<br>    type: 'some',<br>    setType: 'complete' }<br>} |

Performing the set operation (source schema set representation & destination schema set representation) generates the following set representation:

| Worked example 1: source schema representation & destination schema representation |
|---|
| EmptySomeCompleteSet { type: 'empty', setType: 'complete' } |

Calculating the added support according to the added support formula (destination schema set representation & !(source schema representation & destination schema representation) generates the following set representation:

| Worked example 1: added support set representation |
|---|
| SomeCompleteSet {<br>    config:<br>        { array: EmptyTypeSet { setType: 'array', type: 'empty' },<br>          boolean: EmptyTypeSet { setType: 'boolean', type: 'empty' },<br>          integer: EmptyTypeSet { setType: 'integer', type: 'empty' },<br>          null: EmptyTypeSet { setType: 'null', type: 'empty' },<br>          number: AllTypeSet { setType: 'number', type: 'all' },<br>          object: EmptyTypeSet { setType: 'object', type: 'empty' },<br>          string: EmptyTypeSet { setType: 'string', type: 'empty' } },<br>    type: 'some',<br>    setType: 'complete' } |

Translating the added support set representation to a schema according to process 800 described above generates the following schema:

| Worked example 1: added support schema |
|---|
| {<br>    "type": "number"<br>} |

Calculating the removed support according to the added support formula (source schema set representation & !(source schema representation & destination schema representation) generates the following set representation:

| Worked example 1: removed support set representation |
|---|
| SomeCompleteSet {<br>    config:<br>        { array: EmptyTypeSet { setType: 'array', type: 'empty' },<br>          boolean: EmptyTypeSet { setType: 'boolean', type: 'empty' },<br>          integer: EmptyTypeSet { setType: 'integer', type: 'empty' },<br>          null: EmptyTypeSet { setType: 'null', type: 'empty' },<br>          number: EmptyTypeSet { setType: 'number', type: 'empty' },<br>          object: EmptyTypeSet { setType: 'object', type: 'empty' },<br>          string: AllTypeSet { setType: 'string', type: 'all' } },<br>    type: 'some',<br>    setType: 'complete' } |

Translating the removed support set representation to a schema according to process 800 described above generates the following schema:

| Worked example 1: removed support schema |
|---|
| {<br>    "type": "string"<br>} |

Worked Example 2

Worked example 2 has the following source schema:

| Worked example 2: source schema |
|---|
| ```
{
    "type": "array",
    "items": {
        "type": "number"
    }
}
``` |

Translation of the source schema according to process 200 described above generates the following set representation:

| Worked example 2: source schema set representation |
|---|
| ```
SomeCompleteSet {
    config:
        { array:
            SomeTypeSet {
                setType: 'array',
                subsets:
                    [ SomeArraySubset {
                        config:
                            items:
                                SomeCompleteSet {
                                    config:
                                        { array: EmptyTypeSet { setType: 'array', type: 'empty' },
                                          boolean: EmptyTypeSet { setType: 'boolean', type: 'empty' },
                                          integer: EmptyTypeSet { setType: 'integer', type: 'empty' },
                                          null: EmptyTypeSet { setType: 'null', type: 'empty' },
                                          number: AllTypeSet { setType: 'number', type: 'all' },
                                          object: EmptyTypeSet { setType: 'object', type: 'empty' },
                                          string: EmptyTypeSet { setType: 'string', type: 'empty' } },
                                    type: 'some',
                                    setType: 'complete' },
                            maxItems: Infinity,
                            minItems: 0,
                            type: [ 'array' ],
                            not: [ ] },
                        type: 'some',
                        setType: 'array' } ],
                type: 'some' },
          boolean: EmptyTypeSet { setType: 'boolean', type: 'empty' },
          integer: EmptyTypeSet { setType: 'integer', type: 'empty' },
          null: EmptyTypeSet { setType: 'null', type: 'empty' },
          number: EmptyTypeSet { setType: 'number', type: 'empty' },
          object: EmptyTypeSet { setType: 'object', type: 'empty' },
          string: EmptyTypeSet { setType: 'string', type: 'empty' } },
    type: 'some',
    setType: 'complete' }
``` |

Worked example 2 has the following destination schema:

| Worked example 2: destination schema |
|---|
| ```
{
    "type": "array",
    "items": {
        "type": [
            "number",
            "string"
        ]
    }
}
``` |

Translation of the destination schema according to process 200 described above generates the following set representation:

| Worked example 2: destination schema set representation |
|---|

```
SomeCompleteSet {
    config:
        { array:
            SomeTypeSet {
                setType: 'array',
                subsets:
                    [ SomeArraySubset {
                        config:
                            items:
                                SomeCompleteSet {
                                    config:
                                        { array: EmptyTypeSet { setType: 'array', type: 'empty' },
                                          boolean: EmptyTypeSet { setType: 'boolean', type: 'empty' },
                                          integer: EmptyTypeSet { setType: 'integer', type: 'empty' },
                                          null: EmptyTypeSet { setType: 'null', type: 'empty' },
                                          number: AllTypeSet { setType: 'number', type: 'all' },
                                          object: EmptyTypeSet { setType: 'object', type: 'empty' },
                                          string: AllTypeSet { setType: 'string', type: 'all' } },
                                    type: 'some',
                                    setType: 'complete' },
                            maxItems: Infinity,
                            minItems: 0,
                            type: [ 'array' ],
                            not: [ ] },
                        type: 'some',
                        setType: 'array' } ],
                type: 'some' },
        boolean: EmptyTypeSet { setType: 'boolean', type: 'empty' },
        integer: EmptyTypeSet { setType: 'integer', type: 'empty' },
        null: EmptyTypeSet { setType: 'null', type: 'empty' },
        number: EmptyTypeSet { setType: 'number', type: 'empty' },
        object: EmptyTypeSet { setType: 'object', type: 'empty' },
        string: EmptyTypeSet { setType: 'string', type: 'empty' } },
    type: 'some',
    setType: 'complete' }
```

Performing the set operation (source schema set representation & destination schema set representation) generates the following set representation:

| Worked example 2: source schema representation & destination schema representation |
|---|

```
SomeCompleteSet {
    config:
        { array:
            SomeTypeSet {
                setType: 'array',
                subsets:
                    [ SomeArraySubset {
                        config:
                            { items:
                                SomeCompleteSet {
                                    config:
                                        { array: EmptyTypeSet { setType: 'array', type: 'empty' },
                                          boolean: EmptyTypeSet { setType: 'boolean', type: 'empty' },
                                          integer: EmptyTypeSet { setType: 'integer', type: 'empty' },
                                          null: EmptyTypeSet { setType: 'null', type: 'empty' },
                                          number: AllTypeSet { setType: 'number', type: 'all' },
                                          object: EmptyTypeSet { setType: 'object', type: 'empty' },
                                          string: EmptyTypeSet { setType: 'string', type: 'empty' } },
                                    type: 'some',
                                    setType: 'complete' },
                            maxItems: Infinity,
                            minItems: 0,
                            not: [ ] },
                        type: 'some',
                        setType: 'array' } ],
                type: 'some' },
        boolean: EmptyTypeSet { setType: 'boolean', type: 'empty' },
        integer: EmptyTypeSet { setType: 'integer', type: 'empty' },
        null: EmptyTypeSet { setType: 'null', type: 'empty' },
```

| Worked example 2: source schema representation & destination schema representation |
|---|
|         number: EmptyTypeSet { setType: 'number', type: 'empty' },<br>        object: EmptyTypeSet { setType: 'object', type: 'empty' },<br>        string: EmptyTypeSet { setType: 'string', type: 'empty' } },<br>  type: 'some',<br>  setType: 'complete' } |

Calculating the added support according to the added support formula (destination schema set representation & !(source schema representation & destination schema representation) generates the following set representation:

| Worked example 2: added support set representation |
|---|
| SomeCompleteSet {<br>    config:<br>        { array:<br>            SomeTypeSet {<br>                setType: 'array',<br>                subsets:<br>                    [ SomeArraySubset {<br>                        config:<br>                          { items:<br>                            SomeCompleteSet {<br>                            config:<br>                              { array: EmptyTypeSet { setType: 'array', type: 'empty' },<br>                                boolean: EmptyTypeSet { setType: 'boolean', type: 'empty' },<br>                                integer: EmptyTypeSet { setType: 'integer', type: 'empty' },<br>                                null: EmptyTypeSet { setType: 'null', type: 'empty' },<br>                                number: AllTypeSet { setType: 'number', type: 'all' },<br>                                object: EmptyTypeSet { setType: 'object', type: 'empty' },<br>                                string: AllTypeSet { setType: 'string', type: 'all' } },<br>                          type: 'some',<br>                          setType: 'complete' },<br>                    maxItems: Infinity,<br>                    minItems: 0,<br>                    not:<br>                      [ { items:<br>                          SomeCompleteSet {<br>                            config:<br>                              { array: EmptyTypeSet { setType: 'array', type: 'empty' },<br>                                boolean: EmptyTypeSet { setType: 'boolean', type: 'empty' },<br>                                integer: EmptyTypeSet { setType: 'integer', type: 'empty' },<br>                                null: EmptyTypeSet { setType: 'null', type: 'empty' },<br>                                number: AllTypeSet { setType: 'number', type: 'all' },<br>                                object: EmptyTypeSet { setType: 'object', type: 'empty' },<br>                                string: EmptyTypeSet { setType: 'string', type: 'empty' } },<br>                        type: 'some',<br>                        setType: 'complete' },<br>                    maxItems: Infinity,<br>                    minItems: 0,<br>                    not: [ ] } ] },<br>              type: 'some',<br>              setType: 'array' } ],<br>          type: 'some' },<br>        boolean: EmptyTypeSet { setType: 'boolean', type: 'empty' },<br>        integer: EmptyTypeSet { setType: 'integer', type: 'empty' },<br>        null: EmptyTypeSet { setType: 'null', type: 'empty' },<br>        number: EmptyTypeSet { setType: 'number', type: 'empty' },<br>        object: EmptyTypeSet { setType: 'object', type: 'empty' },<br>        string: EmptyTypeSet { setType: 'string', type: 'empty' } },<br>  type: 'some',<br>  setType: 'complete' } |

Translating the added support set representation to a schema according to process 800 described above generates the following schema:

| Worked example 2: added support schema |
|---|
| {<br>    "type": "array",<br>    "items": {<br>        "type": [<br>            "number",<br>            "string"<br>        ]<br>    },<br>    "not": {<br>        "type": "array",<br>        "items": {<br>            "type": "number"<br>        }<br>    }<br>} |

Calculating the removed support according to the added support formula (source schema set representation & !(source schema representation & destination schema representation) generates the following set representation:

| Worked example 2: removed support set representation |
|---|
| EmptyJsonSet { type: 'empty', setType: 'complete' } |

Translating the removed support set representation to a schema according to process 800 described above generates the following schema:

| Worked example 2: removed support schema |
|---|
| False |

Example System Architecture

The processing and techniques described above are performed by one or more computer processing systems. FIG. 12 provides an example client server architecture 1200 in accordance with one implementation.

Architecture 1200 includes a server system 1210 and user device 1230 which communicate via one or more telecommunications networks 1250.

Server system 1210 hosts a server application 1212. The server application is executed by the server system 1210 to configure it to provide server-side functionality to a corresponding client application (e.g. 1242 as discussed below). The server application 1212 comprises one or more application programs, libraries, APIs or other software elements that implement the features and functions that are described herein. For example, where the client application 1232 is a web browser, the server application 1212 will be a web server such as, for example, Apache, 13S, nginx, GWS. Where the client application 1232 is a specific application, the server application 1212 will be a specific application server configured to interact with the client application 1232.

In accordance with the present disclosure, the server application 1212 further includes a schema processing application 1214 which, when executed by the server system 1210 configures it to perform various schema operations as described above. In the present example, the schema processing module includes a translation module 1216 (which handles schema translation, TM for short), a set operation module 1218 (which handles set operations and schema comparisons, SOM for short), a coverage notification module 1220 (which handles schema coverage notifications CNM for short); and a support notification module 1222 (which handles support notifications, SNM for short).

User device 1230 hosts a client application 1232 which, when executed by the user device 1230, configures the user device 1230 to provide client-side functionality/interact with sever system 1210 (or, more specifically, server application 1212 running thereon).

The client application 1232 may be a general web browser application (such as, for example, Chrome, Safari, Internet Explorer, Opera) which accesses the server application 1212 via an appropriate uniform resource locator (URL) and communicates with the server application 1212 via general world-wide-web protocols (e.g. http, https, ftp). Alternatively, the client application 1232 may be a specific application programmed to communicate with server application 1212 using defined application programming interface (API) calls. The client application 1232 can be used by a user to initiate coverage notification processes and schema comparison processes and to control device 1230 to display the results of those processes.

The server system 1210 and user device 1232 communicate data between each other either directly or indirectly through one or more communications networks 1250. Communications network 1250 may comprise a local area network (LAN), a public network, or a combination of networks.

While FIG. 12 depicts a client server architecture alternative implementations/architectures are possible. For example, in an alternative implementation a user system (e.g. user device 1230) may be configured to perform translation and/or comparison operations locally—e.g. by local execution of a schema processing application such as 1214. In this case a server system 1210 is not necessary for translation and/or comparison operations.

Example Computer Processing System

The operations/techniques described herein are implemented by one or more special-purpose computing systems or devices. A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors configured to perform the relevant operations by one or more applications—i.e. computer readable instructions and data stored in firmware, memory, other storage, or a combination thereof.

FIG. 13 is a block diagram that illustrates a computer processing system 1300 upon which embodiments of the invention may be implemented. For example, each of the schema translation process, the coverage notification generation process, and the schema comparison process may be performed by a computer processing system such as system 1300.

Computer system 1300 includes a bus 1302 or other communication mechanism for communicating information, and a hardware processor 1304 coupled with bus 1302 for processing information. Hardware processor 1304 may be, for example, a general purpose microprocessor (e.g. a CPU) or a special purpose processor (e.g. a graphical processing unit or GPU).

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions by the processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, solid state disk, or optical disk, is provided and coupled to bus 1302 for storing information and instructions.

Computer system 1300 may be coupled, via bus 1302, to one more output devices such as a display 1312 for displaying information to a computer user. Display 1312 may, for example, be a cathode ray tube (CRT), a liquid crystal display (LCD), a light emitting diode (LED display), or a touch screen display. An input device 1314, including alphanumeric and other keys, may be coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. Additional and/or alternative input devices are possible, for example touch screen displays.

Computer system 1300 may implement the techniques described herein using customized hard-wired logic, one or more ASICs or FPGAs, firmware and/or program logic which in combination with the computer system causes or programs computer system 1300 to be a special-purpose machine. In certain embodiments, the techniques herein are performed by computer system 1300 in response to processor 1304 executing one or more sequences of computer readable instructions (defined by one or more applications) contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of communications or telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Computer processing system 1300 may be configured in various useful arrangements. In one approach, a data processing method comprises using a computer system, obtaining from one or more non-transitory computer-readable data storage media a copy of one or more applications that define one or more sequences of instructions that are stored on the media and which, when executed by the computer system processor, cause the computer system to perform (either alone or in combination with one or more additional computer systems), the techniques that are described herein.

Furthermore, computer processing system 1300 may take a variety of forms, such as a sever computer (e.g. server system 1210), a desktop computer, a laptop computer, a notebook computer, a tablet computer, a smart phone, or an alternative computing device.

A number of flowcharts have been provided and described in order to illustrate processing/functional steps. Although these flowcharts define steps in particular orders to explain various features in some cases the steps may be able to be performed in a different order or in parallel. This is the case even if the possibility of a different processing order or parallelism has not explicitly been mentioned. Furthermore, in some cases one or more steps may be combined into a single step, a single step may be divided into multiple separate steps, and/or the function(s) achieved by one or more of the described/illustrated steps may be achieved by one or more alternative steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

The invention claimed is:

1. A computer-implemented method for generating a schema support notification informing a recipient of the notification as to whether one Application Programming Interface (API) schema accepts values not accepted by another API schema, the method comprising:
    accessing a source schema defining a first API;
    accessing a destination schema defining a second API different from the first API;
    processing the source schema to generate a source schema set representation having one or more elements corresponding to values accepted by the source schema;
    processing the destination schema to generate a destination schema set representation having one or more elements corresponding to values accepted by the destination schema;
    determining whether the source schema set representation or the destination schema set representation is not empty; and
    in accordance with a determination that at least one of the source schema set representation or the destination schema set representation is not empty:
        performing mathematical set operations on the source schema set representation and the destination schema set representation to identify any support changes between the destination schema and the source schema, wherein a support change is a change in value accepted by one of (a) the destination schema, or (b) the source schema, but not both;
        generating and transmitting a support notification to a user of either the first API or the second API, the support notification identifying at least one of the first API or the second API and identifying any support changes identified as a result of the mathematical set operations; and
        causing display of a representation of the support changes to visually distinguish between the source schema and the destination schema.

2. The computer implemented method of claim 1, wherein:
    the support changes identified include one or more added support changes; and
    the support notification indicates that one or more values that were not accepted under the source schema are accepted under the destination schema.

3. The computer implemented method of claim 2, wherein the mathematical set operations performed to identify added support changes comprise:
    determining a first intersection between the destination schema set representation and a complement of a second intersection between the source schema set representation and the destination schema set representation.

4. The computer implemented method of claim 2, wherein performing the mathematical set operations to identify added support changes generates an added support set, and wherein the method further comprises:
    processing the added support set to generate an added support schema; and
    including the added support schema in the support notification.

5. The computer implemented method of claim 4, further comprising:
    generating an added support change using the added support schema; and
    including the added support change in the support notification.

6. The computer implemented method of claim 4, wherein if the added support set is an empty set the support notification indicates that no added support changes were identified.

7. The computer implemented method of claim 1, wherein:
    the support changes identified include one or more removed support changes; and
    the support notification indicates that one or more values that were accepted under the source schema are not accepted under the destination schema.

8. The computer implemented method of claim 7, wherein the mathematical set operations performed to identify removed support changes comprise:
    determining a first intersection between the source schema set representation and a complement of a second intersection between the source schema set representation and the destination schema set representation.

9. The computer implemented method of claim 7, wherein performing the mathematical set operations to identify removed support changes generates a removed support set, and wherein the method further comprises:
    processing the removed support set to generate a removed support schema; and
    including the removed support schema in the support notification.

10. The computer implemented method of claim 9, further comprising:
    generating a removed support change using the removed support schema; and
    including the removed support change in the support notification.

11. The computer implemented method of claim 9, wherein if the removed support set is an empty set the support notification indicates that no removed support changes were identified.

12. A system comprising:
one or more processors;
one or more non-transitory computer-readable storage media storing sequences of instructions which, when executed by the one or more processors, cause the one or more processors to:
access a source schema defining a first application programming interface (API);
access a destination schema defining a second API different from the first API;
process the source schema to generate a source schema set representation having one or more elements corresponding to values accepted by the source schema;
process the destination schema to generate a destination schema set representation having one or more elements corresponding to values accepted by the destination schema;
determine whether the source schema set representation or the destination schema set representation is not empty; and
in accordance with a determination that at least one of the source schema set representation or the destination schema set representation is not empty:
perform mathematical set operations on the source schema set representation and the destination schema set representation to identify any support changes between the destination schema and the source schema, wherein a support change is a change in value accepted by one of (a) the destination schema, or (b) the source schema, but not both;
generate and transmitting a support notification to a user of either the first API or the second API, the support notification identifying at least one of the first API or the second API and identifying any support changes identified as a result of performing the mathematical set operations; and
cause display of a representation of the support changes to visually distinguish between the source schema and the destination schema.

13. The system of claim 12, wherein:
the support changes identified include one or more added support changes; and
the support notification indicates that one or more values that were not accepted under the source schema are accepted under the destination schema.

14. The system of claim 13, wherein the mathematical set operations performed to identify added support changes comprises:
determining a first intersection between the destination schema set representation and a complement of a second intersection between the source schema set representation and the destination schema set representation.

15. The system of claim 12, wherein:
the support changes identified include one or more removed support changes; and
the support notification indicates that one or more values that were accepted under the source schema are not accepted under the destination schema.

16. The system of claim 15, wherein the mathematical set operations performed to identify removed support changes comprises:
determining a first intersection between the source schema set representation and a complement of a second intersection between the source schema set representation and the destination schema set representation.

17. Non-transitory computer-readable storage media storing sequences of instructions which, when executed by one or more processors, cause the one or more processors to:
access a source schema defining a first application programming interface (API);
access a destination schema defining a second API different from the first API;
process the source schema to generate a source schema set representation having one or more elements corresponding to values accepted by the source schema;
process the destination schema to generate a destination schema set representation having one or more elements corresponding to values accepted by the destination schema;
determine whether the source schema set representation or the destination schema set representation is not empty; and
in accordance with a determination that at least one of the source schema set representation or the destination schema set representation is not empty:
perform mathematical set operations on the source schema set representation and destination schema set representation to identify any support changes between the destination schema and the source schema, wherein a support change is a change in value accepted by one of (a) the destination schema, or (b) the source schema, but not both;
generate a support notification to a user of either the first API or the second API in respect of any support changes identified; and
cause display of a representation of the support changes to visually distinguish between the source schema and the destination schema.

18. The non-transitory computer-readable storage media of claim 17, wherein:
the support changes identified include one or more added support changes;
the mathematical set operations performed to identify added support changes includes determining a first intersection between the destination schema set representation and a complement of a second intersection between the source schema set representation and the destination schema set representation; and
the support notification indicates that one or more values that were not accepted under the source schema are accepted under the destination schema.

19. The non-transitory computer-readable storage media of claim 17, wherein:
the support changes identified include one or more removed support changes;
the mathematical set operations performed to identify removed support changes includes determining a first intersection between the source schema set representation and a complement of a second intersection between the source schema set representation and the destination schema set representation and;
the support notification indicates that one or more values that were accepted under the source schema are not accepted under the destination schema.

* * * * *